United States Patent
Kira et al.

(10) Patent No.: US 9,150,089 B2
(45) Date of Patent: Oct. 6, 2015

(54) DRIVE DEVICE AND VEHICLE WITH SAME

(71) Applicant: HONDA MOTOR CO., LTD., Tokyo (JP)

(72) Inventors: Nobuhiro Kira, Saitama (JP); Keiichi Ooiso, Saitama (JP); Takeshi Hoshinoya, Saitama (JP); Hideki Morita, Saitama (JP); Koichi Ono, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 14/086,555

(22) Filed: Nov. 21, 2013

(65) Prior Publication Data

US 2014/0080649 A1    Mar. 20, 2014

Related U.S. Application Data

(63) Continuation of application No. 13/259,083, filed as application No. PCT/JP2010/055008 on Mar. 23, 2010, now Pat. No. 8,632,434.

(30) Foreign Application Priority Data

Mar. 31, 2009  (JP) ................................. 2009-087771
Mar. 31, 2009  (JP) ................................. 2009-087772

(51) Int. Cl.
*B60K 17/26*    (2006.01)
*B60K 1/02*    (2006.01)
(Continued)

(52) U.S. Cl.
CPC . *B60K 1/02* (2013.01); *B60K 6/383* (2013.01); *B60K 6/442* (2013.01); *B60K 6/52* (2013.01);
(Continued)

(58) Field of Classification Search
None
See application file for complete search history.

(56) References Cited

U.S. PATENT DOCUMENTS

| 5,419,406 A | 5/1995 | Kawamoto et al. |
| 5,427,196 A | 6/1995 | Yamaguchi et al. |

(Continued)

FOREIGN PATENT DOCUMENTS

| JP | 3-4038 A | 1/1991 |
| JP | 06-078417 A | 3/1994 |

(Continued)

OTHER PUBLICATIONS

Japanese Office Action issued Jul. 16, 2013, in counterpart Japanese Patent Application No. 2012-235033 (2 pp).

(Continued)

*Primary Examiner* — Ramya Burgess
*Assistant Examiner* — Mark Manley
(74) *Attorney, Agent, or Firm* — Westerman, Hattori, Daniels & Adrian, LLP

(57) ABSTRACT

A drive device 1A includes: electric motors 2A and 2B that outputs drive powers; and planetary gear reducers 12A and 12B disposed between axles 10A and 10B connected to cylindrical shafts 16A and 16B serving as the output shafts of the electric motors 2A and 2B and to rear wheels LWr and RWr. The drive device 1A further includes: a one-way power transmission device that transmits the one-way rotation power of the electric motors 2A and 2B to the axles 10A and 10B; and a two-way power transmission device that transmits the two-way rotation power of the electric motors 2A and 2B to the axles 10A and 10B. The one-way power transmission device and the two-way power transmission device are disposed on transmission passages from the electric motors 2A and 2B to the axles 10A and 10B.

7 Claims, 16 Drawing Sheets

(51) Int. Cl.
    *B60K 6/383* (2007.10)
    *B60K 6/442* (2007.10)
    *B60K 6/52* (2007.10)
    *B60K 7/00* (2006.01)
    *B60W 30/18* (2012.01)
    *B60W 10/02* (2006.01)
    *B60W 10/08* (2006.01)
    *B60W 10/10* (2012.01)
    *B60W 10/196* (2012.01)
    *B60K 1/00* (2006.01)
    *B60K 17/04* (2006.01)
    *B60W 20/00* (2006.01)

(52) U.S. Cl.
    CPC .............. *B60K 7/0007* (2013.01); *B60W 10/02* (2013.01); *B60W 10/08* (2013.01); *B60W 10/10* (2013.01); *B60W 10/196* (2013.01); *B60W 30/18009* (2013.01); *B60K 1/00* (2013.01); *B60K 17/046* (2013.01); *B60K 17/26* (2013.01); *B60K 2007/0046* (2013.01); *B60K 2007/0092* (2013.01); *B60W 20/00* (2013.01); *Y02T 10/6234* (2013.01); *Y02T 10/6265* (2013.01); *Y10T 477/322* (2015.01)

(56) References Cited

U.S. PATENT DOCUMENTS

| | | |
|---|---|---|
| 5,751,081 A | 5/1998 | Morikawa |
| 6,321,865 B1 | 11/2001 | Kuribayashi et al. |
| 7,727,100 B2 | 6/2010 | Bucknor et al. |

FOREIGN PATENT DOCUMENTS

| | | |
|---|---|---|
| JP | 08-318746 A | 12/1996 |
| JP | 11-99838 A | 4/1999 |
| JP | 11-240347 A | 9/1999 |
| JP | 11-243664 A | 9/1999 |
| JP | 2005-229677 A | 8/2005 |
| JP | 2006-264647 A | 10/2006 |
| JP | 2007-010093 A | 1/2007 |
| JP | 5128537 B2 | 1/2013 |

OTHER PUBLICATIONS

Japanese Office Action issued Mar. 12, 2013, in counterpart Japanese Patent Application No. 2009-087772 (3 pages).
Japanese Office Action issued Mar. 5, 2013, in counterpart Japanese Patent Application No. 2010-217605 (3 pages).
Office Action dated Feb. 13, 2015, issued in corresponding Malaysian Patent Application No. PI2011004639. (3 pages).

FIG. 13

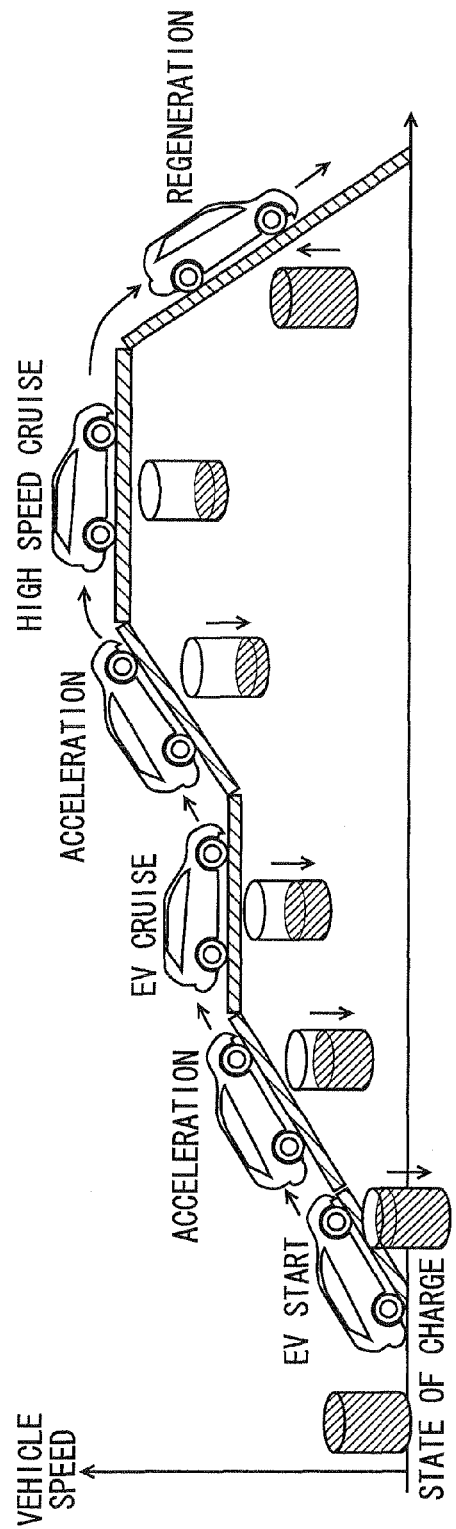

| VEHICLE STATE | FRONT | REAR | MOT STATE | DISENGAGEMENT MECHANISM | |
|---|---|---|---|---|---|
| STOP | — | — | MOT STOPPED | — | |
| EV START | × | ○ | MOT DRIVEN | ON | OWC LOCKING |
| ACCELERATION | ○ | ○ | MOT DRIVEN | ON | OWC LOCKING |
| EV CRUISE | × | ○ | MOT DRIVEN | ON | OWC LOCKING |
| HIGH SPEED CRUISE | ○(TRAVEL BY ENG) | × | MOT STOPPED | OFF | OWC FREE |
| SPONTANEOUS DECELERATION | ○(TRAVEL BY ENG) | × | MOT STOPPED | OFF | OWC FREE |
| DECELERATION REGENERATION | ×OR○ | ○ | MOTOR REGENERATION | ON | BRK ENGAGEMENT |
| ABS ACTIVATION | × | × | MOT STOPPED | OFF | OWC FREE |
| RVS | ×OR○ | ○ | MOTOR REVERSE ROTATION | ON | BRK ENGAGEMENT |
| FWD TOWED | × | × | MOT STOPPED | OFF | OWC FREE |
| FAIL (FAILURE IN HIGH-VOLTAGE SYSTEM) | ○(TRAVEL BY ENG) | × | MOT STOPPED | OFF | OWC FREE |

DRIVE DEVICE AND VEHICLE WITH SAME

CROSS-REFERENCE TO RELATED APPLICATION

This application is a Continuation Application of U.S. patent application Ser. No. 13/259,083, filed Sep. 22, 2011, which is a National Stage entry of International Application No. PCT/JP2010/055008, filed Mar. 23, 2010, which claims priority to Japanese Patent Application No. 2009-087771, filed Mar. 31, 2009 and Japanese Patent Application No. 2009-087772, filed Mar. 31, 2009, the disclosure of the prior applications are hereby incorporated in their entirety by reference.

TECHNICAL FIELD

The present invention relates to a drive device and a vehicle equipped with the same.

BACKGROUND ART

As a vehicle drive device, a device has been proposed in which the left and right axles of a vehicle are connected to a differential apparatus and drive power is transmitted to the differential apparatus via a speed reduction mechanism using an electric motor coaxially disposed on the outer circumferential side of one of the axles (see e.g., Patent document 1).

This drive device 100 is, as shown in FIG. 16, equipped with an electric motor 102 for driving axles, a planetary gear reducer 112 for reducing the drive rotation speed of this electric motor 102, and a differential apparatus 113 for distributing the output of this planetary gear reducer 112 to the left and right axles 110A and 110B of a vehicle, wherein the planetary gear reducer 112 and the electric motor 102 are disposed coaxially with each other on the outer circumferential side of the axle 110B connected to the differential apparatus 113. Furthermore, the sun gear 121 and the planetary carrier 123 of the planetary gear reducer 112 are connected to the rotor 115 of the electric motor 102 and the differential case 131 of the differential apparatus 113, respectively, the ring gear 124 of the planetary gear reducer 112 is rotatably accommodated in the reducer case 111 that is secured to a vehicle body, and a hydraulic brake 128 for applying a braking force to the ring gear 124 by engaging the ring gear 124 with the reducer case 111 is provided between the ring gear 124 and the reducer case 111.

When the braking force is applied to the ring gear 124 by the hydraulic brake 128, the ring gear 124 is secured to the reducer case 111, and the drive power input from the rotor 115 of the electric motor 102 to the sun gear 121 is transmitted to the differential case 131 of the differential apparatus 113 while speed is reduced by a preset reduction ratio. The drive power transmitted to the differential case 131 is distributed to the left and right axles 110A and 110B of the vehicle by the differential apparatus 113. Moreover, when the braking force applied from the hydraulic brake 128 is shut off, the ring gear 124 rotates freely with respect to the reducer case 111. Hence, for example, when the braking force applied by the hydraulic brake 128 is shut off in a state in which the rotation speed of the axles 110A and 110B is higher than that required for the driving of the electric motor 102, the ring gear 124 idly rotates inside the reducer case 111 depending on extra rotation on the sides of the axles 110A and 110B, and the rotations of the axles 110A and 110B are not input to the electric motor 102. Hence, in the case that the driving and regeneration of the electric motor 102 are not necessary, accompanied rotation of the electric motor 102 can be prevented by shutting off the application of the braking force of the hydraulic brake 128, thereby attaining improvement in fuel consumption.

PRIOR ART DOCUMENT

Patent Document

Patent document 1 JP-A-2006-264647

SUMMARY OF THE INVENTION

Problem to be Solved by the Invention

However, in the drive device 100 described in Patent document 1, in the case that the driving and regeneration of the electric motor 102 are carried out, it is necessary that a hydraulic pump is actuated at all times so that the braking force is applied to the ring gear 124. Furthermore, in particular, in the case that a vehicle starts moving immediately after engine start at a low-temperature time, the viscous resistance of oil is high due to low oil temperature, and this causes a problem that the responsiveness of the hydraulic brake 128 cannot be improved.

Furthermore, in the drive device 100 described in Patent document 1, since drive power from the one electric motor 102 is distributed to the left and right axles 110A and 110B of the vehicle by the differential apparatus 113, the left and right wheels cannot be controlled independently. Moreover, in the case that two electric motors capable of outputting drive power to the left and right axles independently are provided, this causes problems that the drive device becomes large in size and the number of components thereof increases.

In view of the above-mentioned problems, a first object of the present invention is to provide a drive device capable of preventing accompanied rotations of the electric motors thereof in the case that the driving and regeneration of the electric motors are not necessary and capable of improving responsiveness at the start time, and to provide a vehicle equipped with the drive device.

Furthermore, in view of the above-mentioned problems, a second object of the present invention is to provide a drive device capable of independently controlling the left and right wheels and capable of being made compact, and to provide a vehicle equipped with the drive device.

Means for Solving the Problem

In order to achieve the above first object of the present invention, according to the first aspect of the present application, there is provided a drive device (e.g., drive device 1A as described below) comprising: an electric motor (e.g., electric motors 2A, 2B as described below) that outputs drive power, and a reducer (e.g., planetary gear reducers 12A, 12B, 12C as described below) disposed between an output shaft (e.g., cylindrical shafts 16A, 16B as described below) of the electric motor and a drive axle (e.g., axles 10A, 10B as described below) connected to a wheel (e.g., rear wheels LWr, RWr as described below); a one-way power transmission device (e.g., one-way clutch 50 as described below) that transmits a one-way rotation power of the electric motor to the drive axle; and a two-way power transmission device (e.g., hydraulic brakes 60A, 60B as described below) that transmits a two-way rotation power of the electric motor to the drive axle, wherein the one-way power transmission device and the two-way power transmission device are disposed on drive power transmission passage from the electric motor to the drive axle.

According to the second aspect, the drive device according to the first aspect, further comprises: a reducer case (e.g., reducer case 11 as described below) that accommodates the reducer and the electric motor, wherein the one-way power transmission device is a one-way clutch (e.g., one-way clutch 50 as described below), and the two-way power transmission device is a brake (e.g., hydraulic brakes 60A, 60B as described below) that shuts off and transmits drive power between some elements of the reducer and the reducer case.

According to the third aspect, in the drive device according to the first or second aspect, the reducer is a planetary gear reducer (e.g., planetary gear reducers 12A, 12B, 12C as described below) comprising three rotation elements (e.g., sun gears 21A, 21B, planetary carriers 23A, 23B and ring gears 24A, 24B as described below). The output shaft of the electric motor is connected to a first rotation element (e.g., sun gear 21A, 21B as described below), the drive axle is connected to a second rotation element (e.g., planetary carriers 23A, 23B as described below), and the one-way power transmission on-off device and the two-way power transmission on-off device is connected to a third rotation element (e.g., ring gears 24A and 24B as described below).

According to the fourth aspect, in the drive device according to the third aspect, the first rotation element of the planetary gear reducer is a sun gear (e.g., sun gear 21A, 21B as described below), the second rotation element thereof is a carrier (e.g., planetary carriers 23A, 23B as described below), and the third rotation element thereof is a ring gear (e.g., ring gears 24A and 24B as described below).

The carrier supports duplex pinions comprising a first pinion (e.g., first pinions 26A, 26B as described below) engaged with the sun gear and a second pinion (e.g., second pinions 27A, 27B as described below) engaged with the ring gear, wherein a diameter of the second pinion is smaller than that of the first pinion. The two-way power transmission on-off device is disposed so as to overlap the first pinion of the duplex pinions in a radial direction and to overlap the second pinion in an axial direction.

According to the fifth aspect, in the drive device according to any one of the first to fourth aspects, the electric motor comprises first and second electric motors (e.g., electric motors 2A, 2B as described below) disposed on the left and right sides in a vehicle width direction, the reducer comprises first and second reducers (e.g., planetary gear reducers 12A, 12B as described below) disposed on the left and right sides in the vehicle width direction, the drive power of the first electric motor is transmitted to a left wheel drive axle (e.g., axle 10A as described below) via the first reducer, and the drive power of the second electric motor is transmitted to a right wheel drive axle (e.g., axle 10B as described below) via the second reducer.

According to the sixth aspect, in the drive device according to the fifth aspect, the first electric motor and the first reducer are disposed coaxially in this order from the outside in the vehicle width direction, the second electric motor and the second reducer are disposed coaxially in this order from the outside in the vehicle width direction, and the first and second electric motors are also disposed coaxially with each other.

According to the seventh aspect, in the drive device according to the fifth or sixth aspect, the brake comprises: a first brake (e.g., hydraulic brake 60A as described below) connected to the ring gear of the first reducer; and a second brake (e.g., hydraulic brake 60B as described below) connected to the ring gear of the second reducer, and the one-way clutch is a one-way clutch (e.g., one-way clutch 50 as described below) connected to the third rotation element of the first reducer and the third rotation element of the second reducer.

According to the eighth aspect, in the drive device according to the seventh aspect, the one-way clutch is disposed between the first and second reducers and is disposed coaxially with the first and second electric motors.

According to the ninth aspect, in the drive device according to the eighth aspect, the ring gear of the first reducer and the ring gear of the second reducer are spline-connected to an inner diameter side of the one-way clutch.

According to the tenth aspect, in the drive device according to any one of the second to ninth aspects, the brake is a hydraulic brake (e.g., hydraulic brakes 60A, 60B as described below), an oil pump (e.g., oil pump 70 as described below) for actuating the brake is provided, the reducer case is supported by first and second supports (e.g., as supports 13a, 13b described below) positioned on the left and right sides of a frame member (e.g., frame member 13 as described below) in the vehicle width direction, and the oil pump is disposed between the first and second supports.

According to the eleventh aspect, in the drive device according to any one of the third to tenth aspects, intermediate walls (e.g., intermediate walls 18A, 18B as described below) are provided inside the reducer case to extend toward the inner diameter side from the reducer case so as to separate electric motor accommodating spaces for accommodating the electric motors from reducer spaces for accommodating the reducers. The intermediate walls are curved from the sides of the reducers to the sides of the electric motors.

Bearings (e.g., bearings 33A, 33B as described below) for rotatably supporting the second rotation elements are disposed on the inner diameter sides of the intermediate walls and on the sides of the reducers, and bus rings (e.g., bus rings 41A, 41B as described below) for stators of the electric motors are disposed on the outer diameter sides of the intermediate walls and on the sides of the electric motors.

In order to achieve a second object of the present invention, in the twelfth aspect, there is provided a drive device (e.g., drive vehicle 1B as described below) comprising two electric motors (e.g., electric motors 2A, 2B as described below) capable of outputting drive power to the left and right drive axles (e.g., axles 10A, 10B as described below) independently. The drive device comprises: reducers (e.g., planetary gear reducers 12A, 12B as described below) provided in drive power transmission passage between the drive axles and the electric motors, wherein each of the reducers comprises three rotation elements (e.g., sun gears 21A, 21B, planetary carriers 23A, 23B and ring gears 24A, 24B as described below), and one of the three rotation elements of one of the reducers and one of the three rotation elements (e.g., ring gears 24A, 24B as described below) of the other reducer are connected to each other.

According to the thirteenth aspect, the drive device according to the twelfth aspect, further comprises: a one-way power transmission device (e.g., one-way clutch 50 as described below) that transmits one-way rotation powers of the electric motors to the drive axles; and a two-way power transmission device (e.g., hydraulic brake 60 as described below) that transmits two-way rotation powers of the electric motors to the drive axles, wherein the one-way power transmission device and the two-way power transmission device are disposed on the drive power transmission passage from the electric motors to the drive axles.

According to the fourteenth aspect, in the drive device according to the thirteenth aspect, the one-way power transmission device and the two-way power transmission device are disposed on the one rotation elements connected to each other.

According to the fifteenth aspect, in the drive device according to the fourteenth aspect, the one-way power transmission device is disposed on one side in the axial direction and the two-way power transmission device is disposed on the other side in the axial direction.

According to the sixteenth aspect, the drive device according to any one of the thirteenth to fifteenth aspects, further comprises: a reducer case (e.g., reducer case 11 as described below) that accommodates the reducers and the electric motors. The one-way power transmission device is a one-way clutch (e.g., one-way clutch 50 as described below), and the two-way power transmission device is a brake (e.g., hydraulic brake 60 as described below) that shuts off and transmits drive power between the reducer case and the one rotation elements connected to each other.

According to the seventeenth aspect, in the drive device according to sixteenth aspect, the brake is a hydraulic brake (e.g., hydraulic brake 60 as described below) actuated by hydraulic pressure, and a piston (e.g., piston 37 as described below) for actuating the brake is disposed between the one-way clutch and the brake.

According to the eighteenth aspect, in the drive device according to any one of thirteenth to seventeenth aspects, the reducers are planetary gear reducers (e.g., planetary gear reducers 12A, 12B as described below) each comprising a first rotation element (e.g., sun gear 21A, 21B as described below), a second rotation element and a third rotation element, wherein the first rotation element is connected to the output shaft (e.g., cylindrical shafts 16A, 16B as described below) of each of the electric motors, the second rotation element (e.g., planetary carriers 23A, 23B as described below) is connected to each of the drive axles, and the third rotation element (e.g., ring gears 24A and 24B as described below) is connected to the one-way power transmission device and the two-way power transmission device.

According to the nineteenth aspect, in the drive device according to eighteenth aspect, the first rotation element is a sun gear (e.g., sun gear 21A, 21B as described below), the second rotation element is a carrier (e.g., planetary carriers 23A, 23B as described below), and the third rotation element is a ring gear (e.g., ring gears 24A and 24B as described below). The carrier supports duplex pinions comprising a first pinion (e.g., first pinions 26A, 26B as described below) engaged with the sun gear and a second pinion (e.g., second pinions 27A, 27B as described below) engaged with the ring gear, wherein a diameter of the second pinion is smaller than that of the first pinion, and wherein the two-way power transmission on-off device is disposed so as to overlap the first pinion of the duplex pinions of one of the reducers in a radial direction and to overlap the second pinion in an axial direction, and wherein the one-way power transmission device is disposed so as to overlap the first pinion of the duplex pinions of the other reducer in the radial direction and to overlap the second pinion in the axial direction.

According to the twentieth aspect, in the drive device according to any one of twelfth to nineteenth aspects, the electric motors and the reducers are disposed coaxially in this order from the outside in the axial direction, and the electric motors are also disposed coaxially with each other.

According to the twenty-first aspect, the drive device according to any one of sixteenth to twentieth aspects, further comprises: a bearing (e.g., bearing 43 as described below) that rotatably supports the third rotation elements connected to each other with respect to the reducer case, wherein the bearing is disposed between the reducers facing each other in the axial direction.

According to the twenty-second aspect, in the drive device according to twenty-first aspect, the piston of the hydraulic brake is disposed outside the bearing in the radial direction.

According to the twenty-third aspect, there is provided a vehicle (e.g., vehicle 3 as described below) comprising the drive device according to any one of the first to twenty-second aspects.

Effect of the Invention

According to the first aspect, in the case that the electric motors are driven and the vehicle travels forward, the one-way power transmission device is provided so that the drive power can be transmitted; hence, the drive power is transmitted by the engagement of the one-way power transmission device without using hydraulic pressure at the start time of the vehicle, whereby the responsiveness at the start time of the vehicle can be improved. Furthermore, in the case that the driving and regeneration of the electric motors are required and in the case that the one-way power transmission device is released, the driving and regeneration of the electric motors can be carried out by performing locking using the two-way power transmission device; what is more, in the case that the driving and regeneration of the electric motors are not required, accompanied rotations of the electric motors can be prevented by releasing the two-way power transmission device. As a result, the electric motors can be operated at a necessary minimum and fuel consumption can be improved.

In addition, according to the second aspect, the one-way power transmission device is formed of the one-way clutch and the two-way power transmission device is formed of the one-way power transmission device, whereby the one-way power transmission device and the two-way power transmission device can be configured using simple configurations.

Furthermore, according to the third aspect, the reducer is formed of the planetary gear reducers, whereby the reducer can be made compact.

Moreover, according to the fourth aspect, duplex pinions are used as the planetary gears, whereby the reduction ratio can be made large and the electric motors can be made compact. Besides, since the ring gears are disposed on the outer circumferential sides of the small-diameter second pinions of the duplex pinions of the duplex pinions, the outer diameter thereof can be made smaller than that when the ring gears are disposed on the outer circumferential sides of the first pinions. Still further, since the two-way power transmission device overlap the first pinions in the radial direction and overlap the second pinions in the axial direction, the entire size of the drive device can be made compact.

In addition, according to the fifth aspect, since the reducers and the electric motors are disposed for the left and right wheels, respectively, the left and right wheels can be controlled independently and driving stability (turning) performance can be improved. Furthermore, in comparison with a case in which turning performance is improved by using one electric motor and two friction members, the loss due to heat generation caused by the slip control of the friction members can be suppressed; hence, it is possible to attain a specification ideally suited for a case in which the drive device is mounted on a hybrid vehicle, for example.

Furthermore, according to the sixth aspect, the reducers and the electric motors are coaxially disposed for the left and right wheels, respectively, and the left and right, first and second electric motors are also coaxially disposed, whereby in the case that the drive device is formed into an approximately cylindrical shape, its vehicle mounting performance can be improved.

Moreover, according to the seventh aspect, a one-way clutch is commonly used for both the left and right sides, whereby the number of components thereof can be reduced.

Besides, according to the eighth aspect, since the one-way clutch is disposed coaxially with the first and second electric motors and between the first and second reducers, the radial length of the drive device can be shortened.

What is more, according to the ninth aspect, the ring gear of the first reducer is separate from the ring gear of the second reducer, whereby the assembling performance thereof can be improved, and the left and right ring gears are spline-connected to the inner diameter side of the one-way clutch, whereby the integrity of the ring gears can be attained securely.

Still further, according to the tenth aspect, the oil pump for actuating the first and second brakes each formed of a hydraulic brake is disposed between the supports of the frame member, whereby empty space can be utilized effectively.

In addition, according to the eleventh aspect, the bearings for supporting the second rotation elements of the planetary gear reducers are disposed on the inner diameter sides of the curved intermediate walls and on the sides of the reducers, and the bus rings are disposed on the outer diameter sides of the intermediate walls and on the sides of the electric motors, whereby the length of the drive device in the width direction of the vehicle can be shortened.

According to the twelfth aspect, since the electric motors and the reducers are provided for the left and right drive axles, respectively, the left and right wheels can be controlled independently and driving stability (turning) performance can be improved. Hence, in comparison with a case in which the turning performance is improved by using one electric motor and two friction members, the loss due to heat generation caused by the slip control of the friction members can be suppressed; hence, it is possible to attain a specification ideally suited for a case in which the drive device is mounted on a hybrid vehicle, for example.

Moreover, the rotation elements, each being one of the three rotation elements constituting the left and right reducers, are connected to each other, whereby the members for controlling the rotation elements can be used in common, whereby the drive device can be made compact and the number of components thereof can be reduced.

Besides, according to the thirteenth aspect, in the case that the electric motors are driven and the vehicle travels forward, the one-way power transmission device is disposed so that drive power can be transmitted, whereby the drive power can be transmitted by the engagement of the one-way power transmission device without using hydraulic pressure at the start time of the vehicle and the responsiveness at the start time of the vehicle can be improved.

What is more, in the case that the driving and regeneration of the electric motors are necessary and the one-way power transmission device is released, the driving and regeneration of the electric motors can be carried out by the locking of the two-way power transmission device; and in the case that the driving and regeneration of the electric motors are not necessary, accompanied rotations of the electric motors can be prevented by the release of the two-way power transmission device. Hence, the electric motors can be operated at a necessary minimum and fuel consumption can be improved.

Still further, according to the fourteenth aspect, the one-way power transmission device and the two-way power transmission device are disposed in the connected rotation elements, whereby both the one-way power transmission device and the two-way power transmission device can be used in common for the left and right units, whereby the drive device can be made compact and the number of components thereof can be reduced.

In addition, according to the fifteenth aspect, the one-way power transmission device and the two-way power transmission device being used in common are disposed on one side and on the other side in the axial direction, whereby the length in the radial direction can be shortened and the drive device can be made compact.

Furthermore, according to the sixteenth aspect, the one-way power transmission device is formed of the one-way clutch and the two-way power transmission device is formed of the brake, whereby the one-way power transmission device and the two-way power transmission device can be configured using simple configurations.

Besides, according to seventeenth aspect, the two-way power transmission device is formed of the hydraulic brake and the piston for actuating the hydraulic brake is disposed between the one-way clutch and the hydraulic brake, whereby the space formed between the one-way clutch and the hydraulic brake can be used effectively and the drive device can be made compact.

What is more, according to the eighteenth aspect, the reducers are formed of the planetary gear reducers, whereby a large reduction ratio can be obtained by a simple configuration.

Still further, according to the nineteenth aspect, duplex pinions are used as the planetary gears of the planetary gear reducers, whereby the reduction ratio can be made large and the electric motors can be made compact. Besides, the one-way power transmission device is disposed so as to overlap the large-diameter first pinion of the duplex pinions of one of the reducers in the radial direction and to overlap the small-diameter second pinion in the axial direction, and the two-way power transmission device is disposed so as to overlap the large-diameter first pinion of the duplex pinions of the other reducer in the radial direction and to overlap the small-diameter second pinion in the axial direction, whereby the lengths thereof in the radial direction and the axial direction can be made shortened and the drive device can be made compact.

In addition, according to the twentieth aspect, the electric motors and the reducers are disposed coaxially in this order from the outside in the axial direction, and the electric motors are also disposed so as to be coaxial with each other, whereby the drive device can be formed into an approximately cylindrical shape. Hence, its vehicle mounting performance thereof can be improved.

Furthermore, according to the twenty-first aspect, the bearing for rotatably supporting the connected third rotation elements with respect to the reducer case is disposed between the reducers opposed to each other in the axial direction, whereby the space formed between the reducers can be used effectively and the drive device can be made compact.

Moreover, according to the twenty-second aspect, the piston of the hydraulic brake is disposed outside the bearing in the radial direction, whereby the space outside the bearing in the radial direction can be used effectively and the drive device can be made compact.

BRIEF DESCRIPTION OF DRAWINGS

FIG. 13 is a view showing the states of the electric motors and the states of disengagement mechanisms in the travel state of the vehicle;

MODES FOR CARRYING OUT THE INVENTION

Configurations of drive devices according to respective embodiments of the present invention will be described below on the basis of FIGS. 1 to 6.

Figure 1:
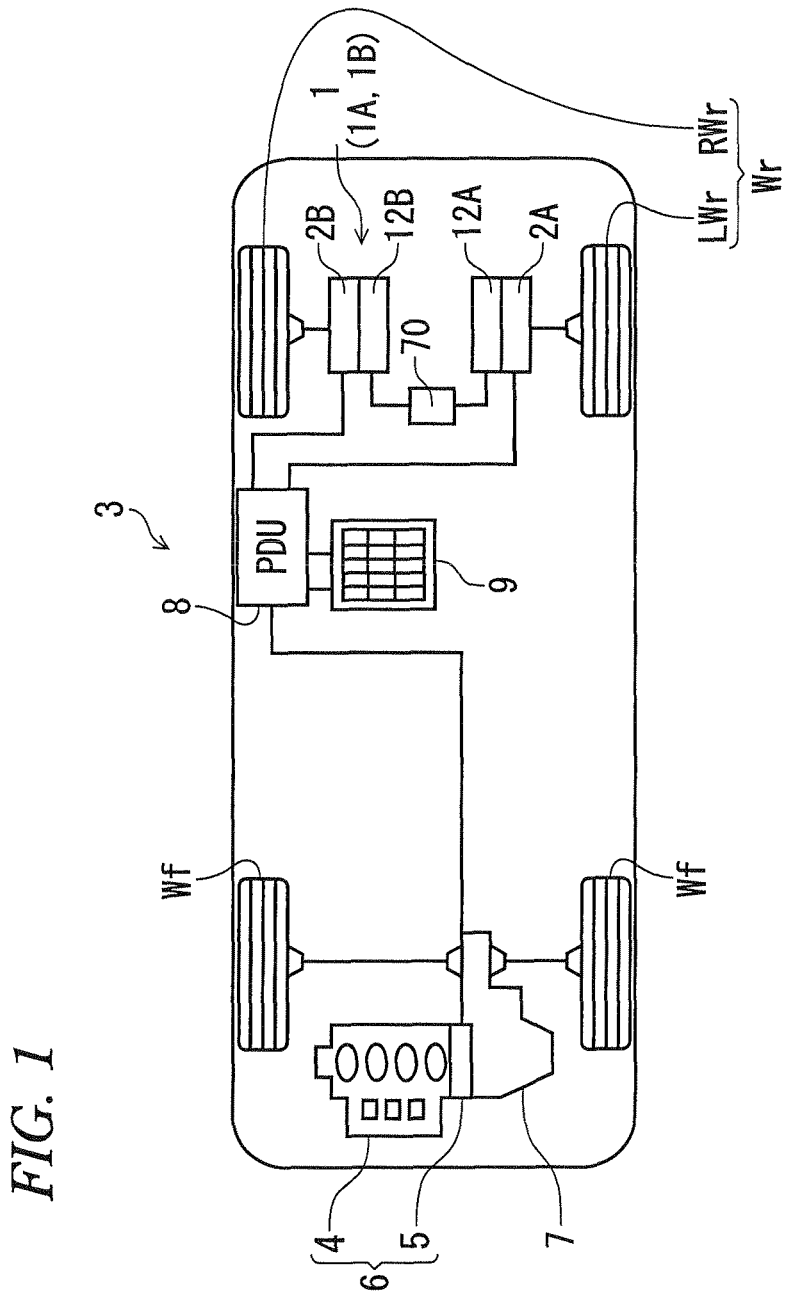
FIG. 1 is a block diagram showing a schematic configuration of a hybrid vehicle according to an embodiment of a vehicle to which a drive device according to the present invention is applicable.

In a drive device 1 according to the present invention, electric motors 2A and 2B serve as drive sources for driving axles and are used for a vehicle 3 having a drive system shown in FIG. 1, for example.

The vehicle 3 shown in FIG. 1 is a hybrid vehicle having a drive device 6 formed of an internal combustion engine 4 and an electric motor 5 connected in series at the front section of the vehicle, and the drive power of this drive device 6 is transmitted to front wheels Wf via a transmission 7; on the other hand, the drive power of the drive device 1 according to the present invention, provided at the rear section of the vehicle and separate from the drive device 6, is transmitted to rear wheels Wr (RWr and LWr). The electric motor 5 of the drive device 6 and the electric motors 2A and 2B of the drive device 1 on the sides of the rear wheels Wr are connected to a battery 9 via a PDU 8 (power drive device), and electric power supply from the battery 9 and energy regeneration to the battery 9 are carried out via the PDU 8. The drive device 1 includes a drive device 1A according to a first embodiment and a drive device 1B according to a second embodiment, described later, and either one may be adopted.

First Embodiment

Figure 2:
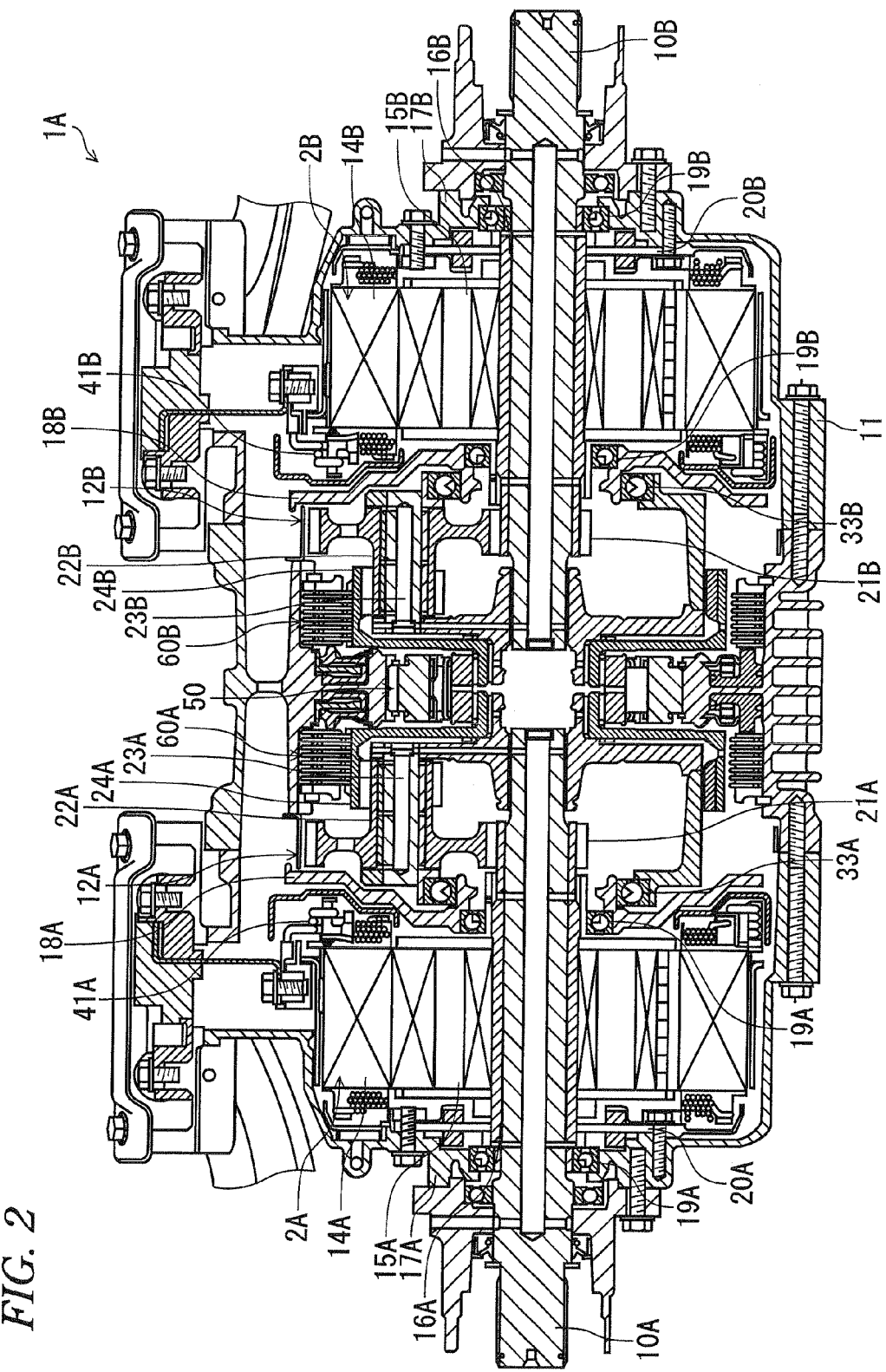
FIG. 2 is a vertical sectional view showing a drive device according to a first embodiment of the present invention.
Figure 6:
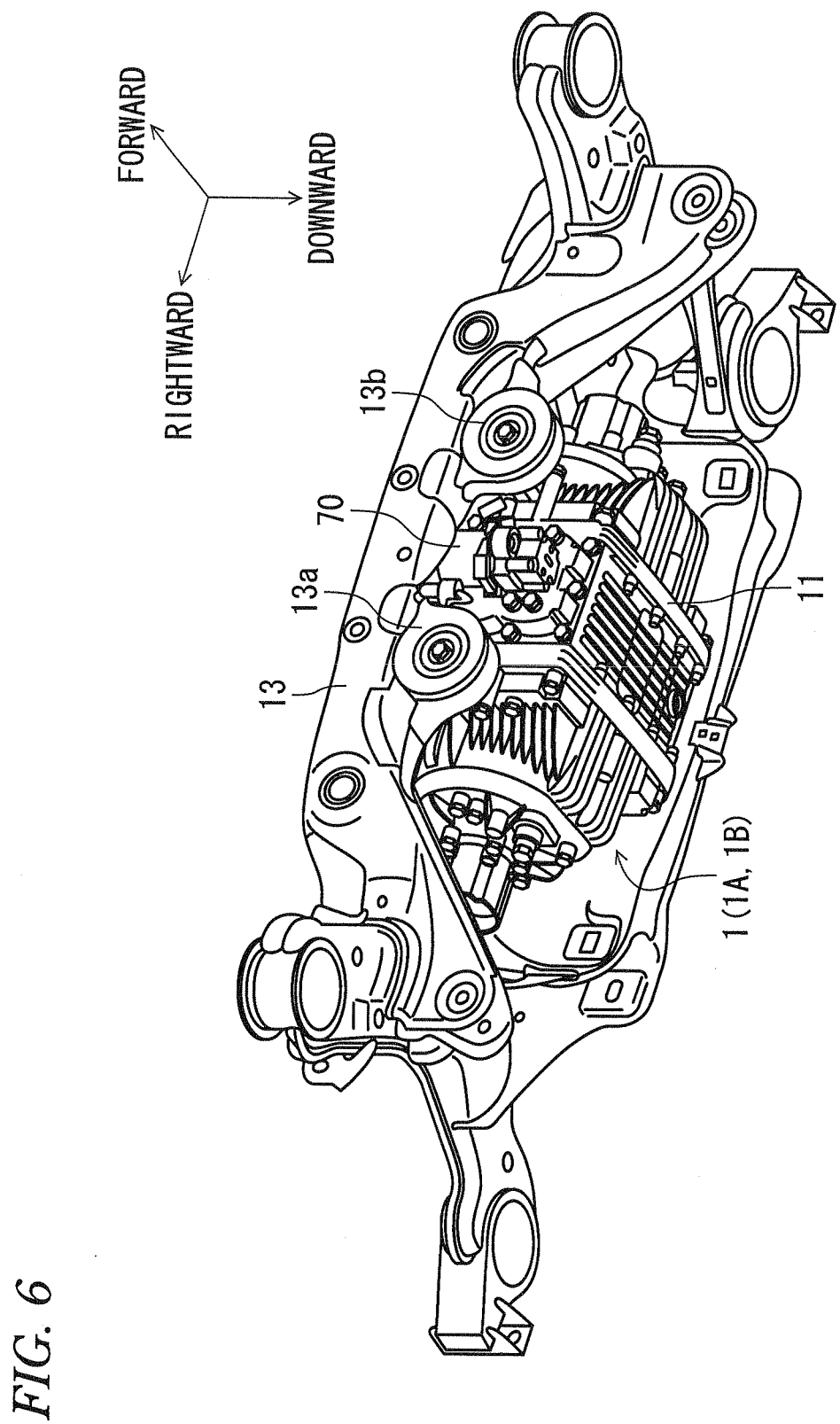
FIG. 6 is a perspective view showing a state in which the drive device according to the present invention is mounted on a frame.

FIG. 2 is a vertical sectional view showing the whole structure of the drive device 1A according to the first embodiment; in the figure, 10A and 10B designate left and right axles on the sides of the rear wheels Wr of the vehicle, and these axles are disposed coaxially in the width direction of the vehicle. The reducer case 11 of the drive device 1A is wholly formed into an approximately cylindrical shape, and in the interior thereof, the electric motors 2A and 2B for driving the axles and planetary gear reducers 12A and 12B for reducing the drive rotation speeds of the electric motors 2A and 2B are disposed coaxially with the axles 10A and 10B. The electric motor 2A and the planetary gear reducer 12A control the left rear wheel LWr, and the electric motor 2B and the planetary gear reducer 12B control the right rear wheel RWr; furthermore, the electric motor 2A and the planetary gear reducer 12A and the electric motor 2B and the planetary gear reducer 12B are disposed so as to be left-right symmetric in the width direction of the vehicle inside the reducer case 11. In addition, as shown in FIG. 6, the reducer case 11 is supported by the supports 13a and 13b of a frame member 13 serving as part of a frame used as the framework of the vehicle 3 and by the frame of the drive device 1A, not shown. The supports 13a and 13b are provided on the left and right sides with respect to the center of the frame member 13 in the width direction of the vehicle. Arrows in FIG. 6 indicate positional relationships in a state in which the drive device 1A is mounted in the vehicle.

The stators 14A and 14B of the electric motors 2A and 2B are secured to the left and right end side interiors of the reducer case 11, respectively, and ring-shaped rotors 15A and 15B are rotatably disposed on the inner circumferential sides of the stators 14A and 14B. Cylindrical shafts 16A and 16B enclosing the outer circumferences of the axles 10A and 10B are connected to the inner circumferential sections of the rotors 15A and 15B, and these cylindrical shafts 16A and 16B are supported by the end walls 17A and 17B and the intermediate walls 18A and 18B of the reducer case 11 via bearings 19A and 19B so as to be coaxial with the axles 10A and 10B and relatively rotatable therewith. Furthermore, resolvers 20A and 20B for feeding back the rotation position information of the rotors 15A and 15B to the controllers (not shown) of the electric motors 2A and 2B are provided on the outer circumferences on one end sides of the cylindrical shafts 16A and 16B and on the end walls 17A and 17B of the reducer case 11.

Moreover, the planetary gear reducers 12A and 12B are equipped with sun gears 21A and 21B, pluralities of planetary gears 22A and 22B engaged with the sun gears 21A and 21B, planetary carriers 23A and 23B for supporting these planetary gears 22A and 22B, and ring gears 24A and 24B engaged with the outer circumferential sides of the planetary gears 22A and 22B, wherein the drive power of the electric motors 2A and 2B is input from the sun gears 21A and 21B and the drive power obtained after speed reduction is output via the planetary carriers 23A and 23B.

Figure 3:
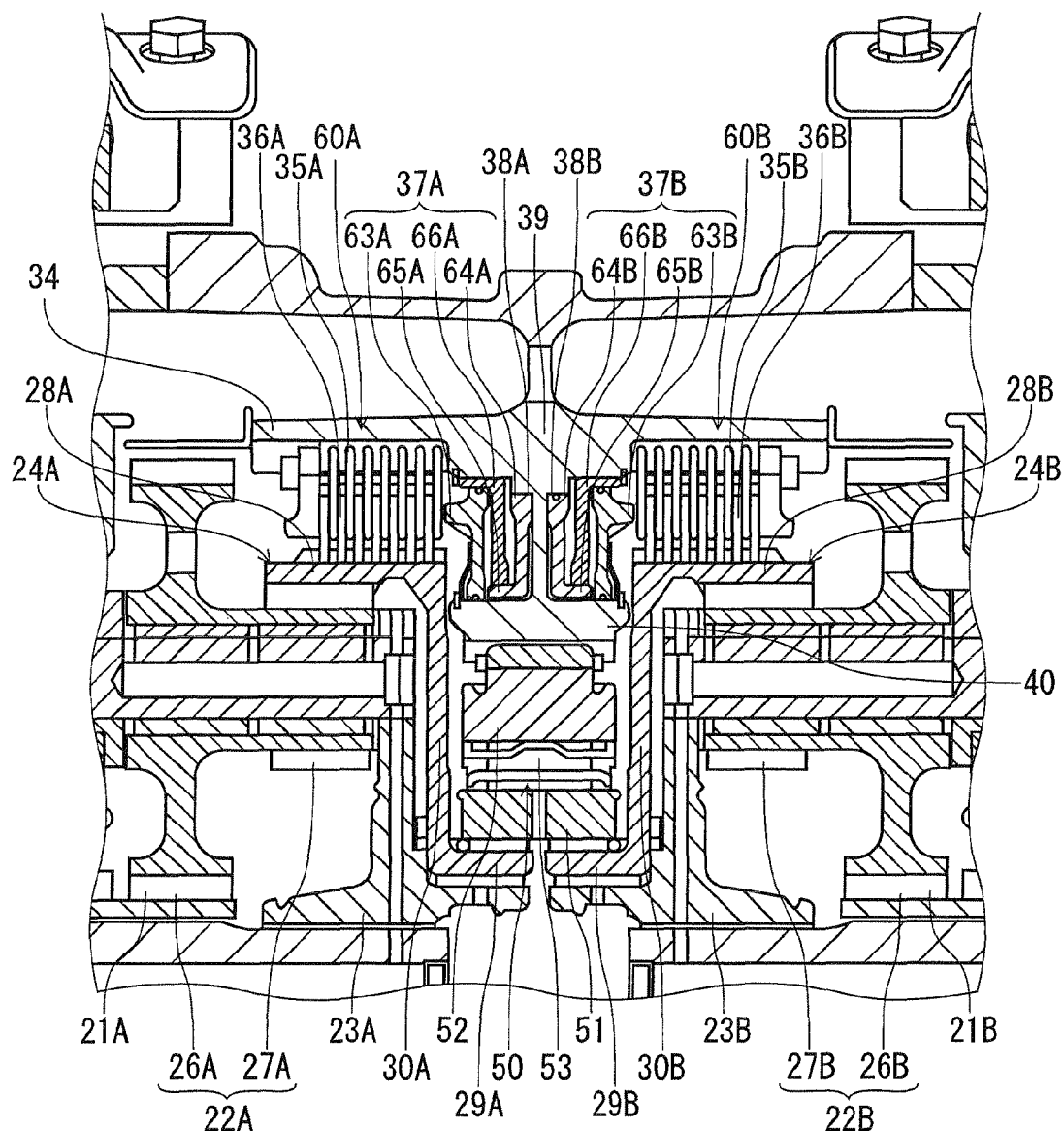
FIG. 3 is a fragmentary enlarged view showing the drive device shown in FIG. 2.

The sun gears 21A and 21B are integrated with the cylindrical shafts 16A and 16B. In addition, as shown in FIG. 3, for example, the planetary gears 22A and 22B are duplex pinions having large-diameter first pinions 26A and 26B directly engaged with the sun gears 21A and 21B and small-diameter second pinions 27A and 27B being smaller in diameter than the first pinions 26A and 26B, and the first pinions 26A and 26B and the second pinions 27A and 27B are integrated so as to be coaxial and offset in the axial direction. The planetary gears 22A and 22B are supported by the planetary carriers 23A and 23B, and the axially inner end sections of the planetary carriers 23A and 23B are extended inward in the radial direction, spline-fitted in the axles 10A and 10B and supported so as to be integrally rotatable and also supported by the intermediate walls 18A and 18B via bearings 33A and 33B.

The intermediate walls 18A and 18B are configured so as to separate electric motor accommodating spaces for accommodating the electric motors 2A and 2B from reducer spaces for accommodating the planetary gear reducers 12A and 12B and so as to be curved so that the mutual axial distances therebetween are increased from the outer diameter sides to the inner diameter sides thereof. Furthermore, the bearings 33A and 33B for supporting the planetary carriers 23A and 23B are disposed on the inner diameter sides of the intermediate walls 18A and 18B and on the sides of the planetary gear reducers 12A and 12B; moreover, bus rings 41A and 41B for the stators 14A and 14B are disposed on the outer diameter sides of the intermediate walls 18A and 18B and on the sides of the electric motors 2A and 2B (see FIG. 2).

The ring gears 24A and 24B are equipped with gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. The maximum radius of the ring gears 24A and 24B is set so as to be smaller than the maximum distance between the first pinions 26A and 26B and the center of the axles 10A and 10B. The small-diameter sections 29A and 29B are respectively spline-fitted in the inner race 51 of one-way clutch 50 described later, and the ring gears 24A and 24B are configured so as to be rotated integrally with the inner race 51 of the one-way clutch 50.

Cylindrical space sections are securely obtained between the reducer case 11 and the ring gears 24A and 24B, and hydraulic brakes 60A and 60B serving as braking means for the ring gears 24A and 24B are disposed inside the space sections so as to overlap the first pinions 26A and 26B in the radial direction and to overlap the second pinions 27A and 27B in the axial direction. In the hydraulic brakes 60A and 60B, pluralities of stationary plates 35A and 35B spline-fitted in the inner circumferential face of a cylindrical outer diameter side support 34 extending in the axial direction on the inner diameter side of the reducer case 11 and pluralities of rotation plates 36A and 36B spline-fitted in the outer circumferential faces of the ring gears 24A and 24B are disposed alternately in the axial direction, and these plates 35A, 35B, 36A and 36B are engaged and released by ring-shaped pistons 37A and 37B. The pistons 37A and 37B are accommodated so as to be advanced and retracted in ring-shaped cylinder chambers 38A and 38B formed between a left-right partition wall 39 extended from the intermediate position of the housing 11 to the inner diameter side thereof and the outer diameter side support 34 and an inner diameter side support 40 connected by the left-right partition wall 39, wherein the pistons 37A and 37B are advanced by introducing high-pressure oil into the cylinder chambers 38A and 38B and retracted by discharging the oil from the cylinder chambers 38A and 38B. The hydraulic brakes 60A and 60B are connected to an oil pump 70 disposed between the supports 13a and 13b of the above-mentioned frame member 13 as shown in FIG. 6.

Furthermore, in more detail, the pistons 37A and 37B have first piston walls 63A and 63B and second piston walls 64A and 64B in the axial front-rear direction, and these piston walls 63A, 63B, 64A and 64B are connected by cylindrical inner circumferential walls 65A and 65B. Hence, ring-shaped spaces being open outward in the radial direction are formed between the first piston walls 63A and 63B and the second piston walls 64A and 64B, and the ring-shaped spaces are partitioned in the axial front-rear direction by partition members 66A and 66B secured to the inner circumferential faces of the outer walls of the cylinder chambers 38A and 38B. The spaces between left-right partition wall 39 of the reducer case 11 and the second piston walls 64A and 64B are used as first actuation chambers into which high-pressure oil is introduced directly, and the spaces between the partition members 66A and 66B and the first piston walls 63A and 63B are used as second actuation chambers communicating with the first actuation chambers via through holes formed in the inner circumferential walls 65A and 65B. The spaces between the second piston walls 64A and 64B and the partition members 66A and 66B communicates with the atmosphere.

In the hydraulic brakes 60A and 60B, high-pressure oil is introduced into the first and second actuation chambers, and the stationary plates 35A and 35B and the rotation plates 36A and 36B can be pressed against each other by the oil pressure acting on the first piston walls 63A and 63B and the second piston walls 64A and 64B. Hence, large pressure-receiving areas can be obtained by the first and second piston walls 63A, 63B, 64A and 64B in the axial front-rear direction, whereby large pressing forces for the stationary plates 35A and 35B and the rotation plates 36A and 36B can be obtained while the radial areas of the pistons 37A and 37B are suppressed.

In the case of the hydraulic brakes 60A and 60B, the stationary plates 35A and 35B are supported by the outer diameter side support 34 extended from the reducer case 11, and the rotation plates 36A and 36B are supported by the ring gears 24A and 24B; hence, when the plates 35A and 36A and the plates 35B and 36B are pressed by the pistons 37A and 37B, braking forces are applied to fix the ring gears 24A and 24B by the frictional engagement between the plates 35A and 36A and between the plates 35B and 36B; when the engagement by the pistons 37A and 37B is released from the state, the ring gears 24A and 24B are allowed to rotate freely.

Furthermore, a space section is securely obtained between the connection sections 30A and 30B of the ring gears 24A and 24B opposed in the axial direction, and the one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrally rotated with the small-diameter sections 29A and 29B of the ring gears 24A and 24B by virtue of spline fitting. Moreover, the outer race 52 is positioned by the inner diameter side support 40 and prevented from being rotated. When the vehicle travels forward, the one-way clutch 50 is configured so as to engage, thereby locking the rotations of the ring gears 24A and 24B. More specifically, the one-way clutch 50 is configured so as to lock or disengage the ring gears 24A and 24B depending on the actuation direction of the torque acting on the ring gears 24A and 24B; assuming that the rotation directions of the sun gears 21A and 21B are forward directions when the vehicle travels forward, in the case that reverse rotation direction torque is applied to the ring gears 24A and 24B, the rotations of the ring gears 24A and 24B are locked.

Second Embodiment

Next, a drive device according to a second embodiment of the present invention will be described referring to FIGS. 4 and 5. The drive device according to the second embodiment has the same configuration as that of the drive device 1A according to the first embodiment, except for the dispositions of the hydraulic brakes and the one-way clutch; hence, the same or equivalent components are disengaged by the same or equivalent reference codes, and their descriptions are omitted.

Figure 4:
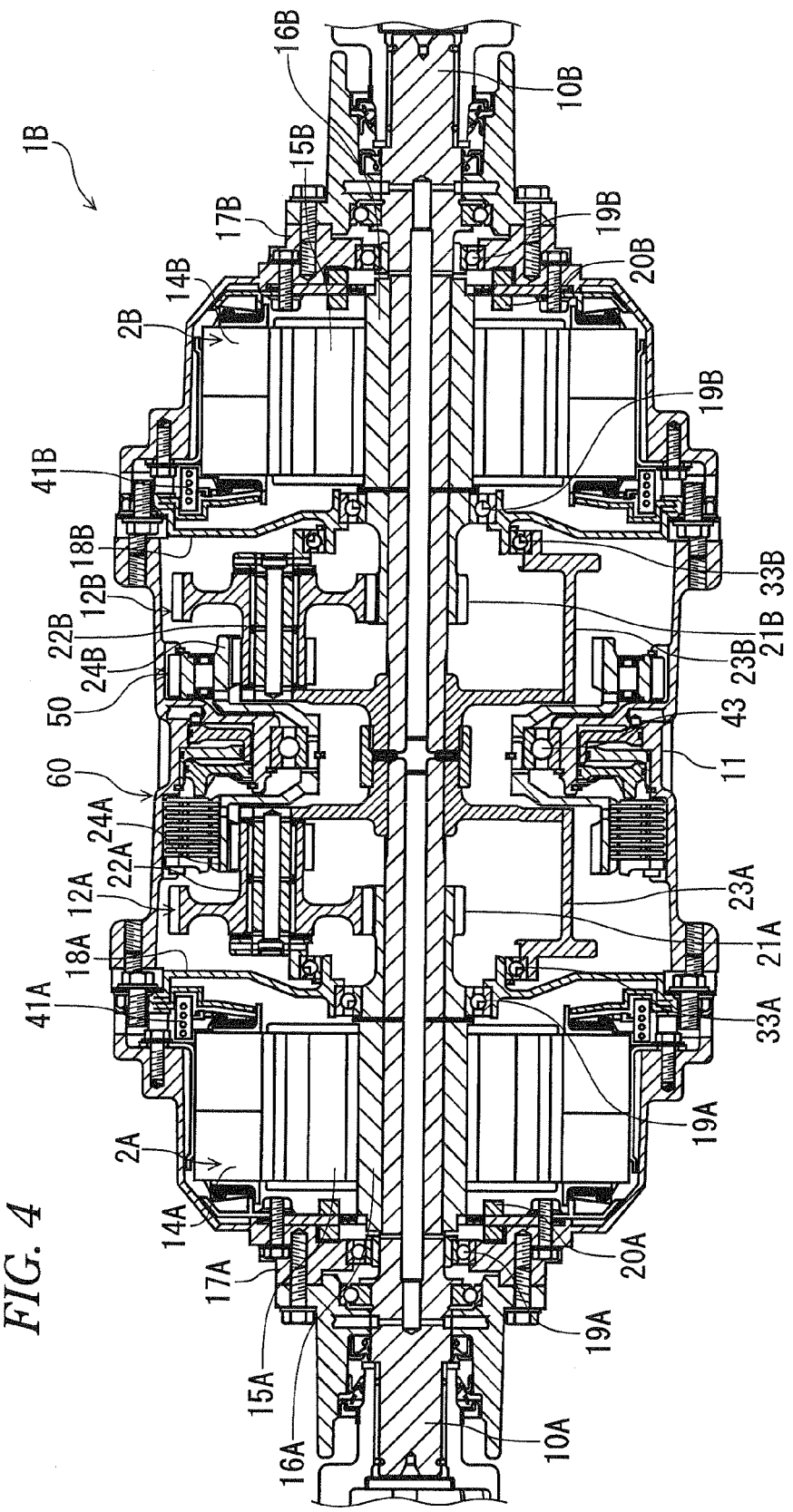
FIG. 4 is a vertical sectional view showing a drive device according to a second embodiment of the present invention.
Figure 5:
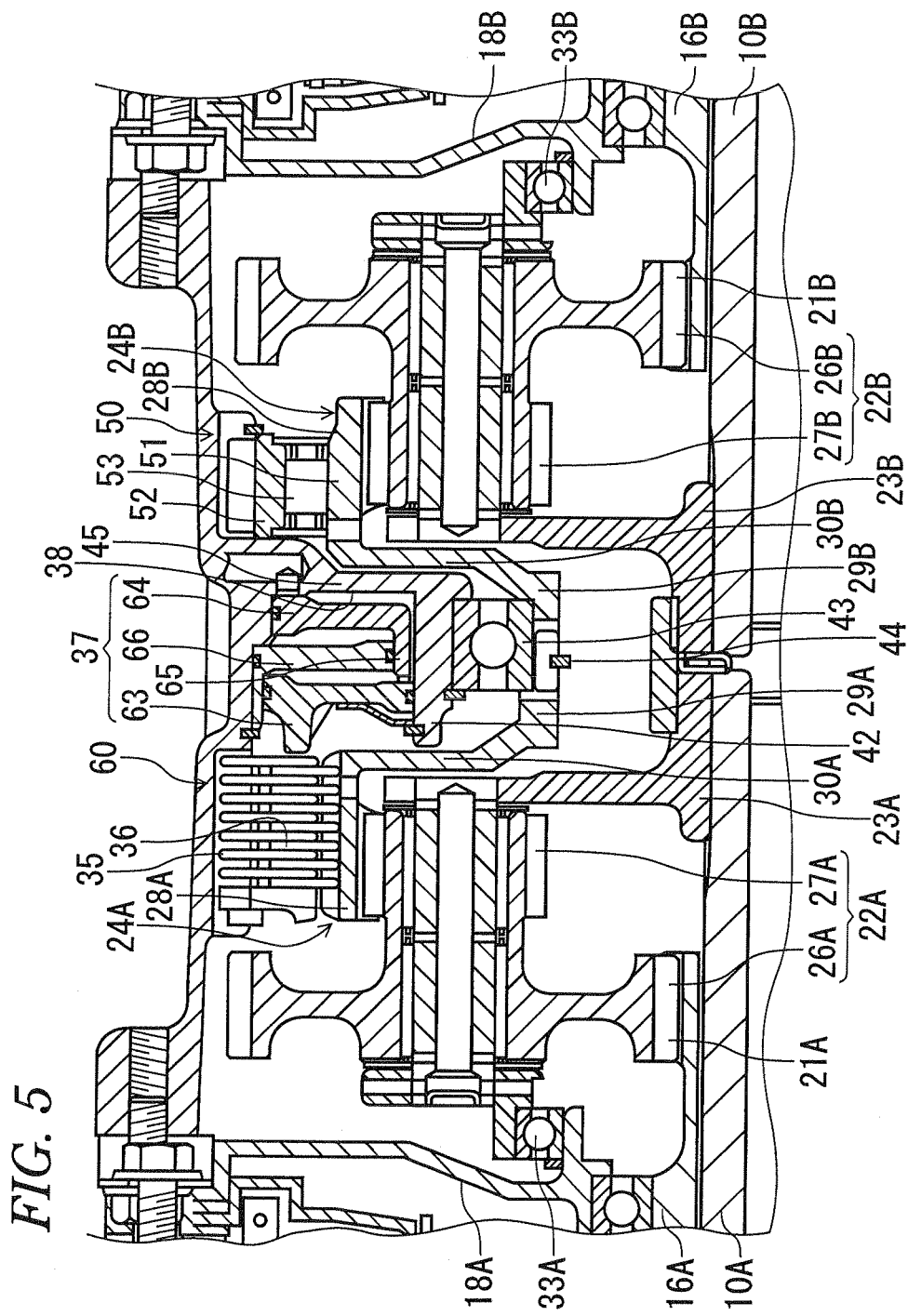
FIG. 5 is a fragmentary enlarged view showing the drive device shown in FIG. 4.

FIG. 4 is a vertical sectional view showing the whole structure of the drive device 1B according to the second embodiment; in the figure, 10A and 10B designate left and right axles on the sides of the rear wheels Wr of the vehicle, and these axles are disposed coaxially in the width direction of the vehicle. The reducer case 11 of the drive device 1B is wholly formed into an approximately cylindrical shape, and in the interior thereof, the electric motors 2A and 2B for driving the axles and planetary gear reducers 12A and 12B for reducing the drive rotation speeds of the electric motors 2A and 2B are disposed coaxially with the axles 10A and 10B. The electric motor 2A and the planetary gear reducer 12A control the left rear wheel LWr, and the electric motor 2B and the planetary gear reducer 12B control the right rear wheel RWr; furthermore, the electric motor 2A and the planetary gear reducer 12A and the electric motor 2B and the planetary gear reducer 12B are disposed so as to be left-right symmetric in the width direction of the vehicle inside the reducer case 11.

The planetary gear reducers 12A and 12B are equipped with sun gears 21A and 21B, pluralities of planetary gears 22A and 22B engaged with the sun gears 21, planetary carriers 23A and 23B for supporting these planetary gears 22A and 22B, and ring gears 24A and 24B engaged with the outer circumferential sides of the planetary gears 22A and 22B, wherein the drive power of the electric motors 2A and 2B is input from the sun gears 21A and 21B and the drive power obtained after speed reduction is output via the planetary carriers 23A and 23B.

The ring gears 24A and 24B are equipped with gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. The maximum radius of the ring gears 24A and 24B is set so as to be smaller than the maximum distance between the first pinions 26A and 26B and the center of the axles 10A and 10B. The small-diameter sections 29A and 29B are rotatably supported via a bearing 43 by the cylindrical support 42 of the reducer case 11 opposed on the outside in the radial direction and are connected by a stop ring 44. The cylindrical support 42 is extended from a position located at the approximately central section of the reducer case 11 and deviated to the side of the planetary gear reducer 12B to a position on the side of the planetary gear reducer 12A from the inner diameter side end section of a support wall 45 extended inward in the radial direction.

A cylindrical space section is securely obtained between the reducer case 11 and the ring gear 24A, and a hydraulic brake 60 serving as braking means for the ring gears 24A and 24B are disposed so as to overlap the first pinion 26A in the radial direction and to overlap the second pinion 27A in the axial direction. In the hydraulic brake 60, a plurality of stationary plates 35 spline-fitted in the inner circumferential face of the reducer case 11 and a plurality of rotation plates 36 spline-fitted in the outer circumferential face of the ring gear 24A are disposed alternately in the axial direction, and these plates 35 and 36 are engaged and released by a ring-shaped piston 37. The piston 37 is accommodated so as to be advanced and retracted in a ring-shaped cylinder chamber 38 formed among the reducer case 11, the support wall 45 and the cylindrical support 42, wherein the piston 37 is advanced by introducing high-pressure oil into the cylinder chamber 38 and retracted by discharging the oil from the cylinder chamber 38. The hydraulic brake 60 is connected to an oil pump 70 disposed between the supports 13a and 13b of the above-mentioned frame member 13 as shown in FIG. 4.

Furthermore, in more detail, the piston 37 has a first piston wall 63 and a second piston wall 64 in the axial front-rear direction, and these piston walls 63 and 64 are connected by a cylindrical inner circumferential wall 65. Hence, a ring-shaped space being open outward in the radial direction is formed between the first piston wall 63 and the second piston wall 64, and the ring-shaped space is partitioned in the axial front-rear direction by a partition member 66 secured to the inner circumferential faces of the outer wall of the cylinder chamber 38. The space between the support wall 39 of the reducer case 11 and the second piston wall 64 is used as a first actuation chamber into which high-pressure oil is introduced directly, and the space between the partition member 66 and the first piston wall 63 is used as a second actuation chamber communicating with the first actuation chamber via a through hole formed in the inner circumferential wall 65. The space between the second piston wall 64 and the partition member 66 communicates with the atmosphere.

In the hydraulic brake 60, high-pressure oil is introduced into the first and second actuation chambers, and the stationary plates 35 and the rotation plates 36 can be pressed against each other by the oil pressures acting on the first piston wall 63 and the second piston wall 64. Hence, a large pressure-receiving area can be obtained by the first and second piston walls 63 and 64 in the axial front-rear direction, whereby a large pressing force for the stationary plates 35 and the rotation plates 36 can be obtained while the radial area of the piston 37 is suppressed.

In the case of the hydraulic brake 60, the stationary plates 35 are supported by the reducer case 11, and the rotation plates 36 are supported by the ring gear 24A; hence, when the plates 35 and 36 are pressed by the piston 37, a braking force is applied to fix the mutually connected ring gears 24A and 24B by the frictional engagement between the plates 35 and 36; when the engagement by the piston 37 is released from the state, the connected ring gears 24A and 24B are allowed to rotate freely.

Furthermore, a cylindrical space section is securely obtained between the reducer case 11 and the ring gear 24B, and a one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrated with the gear section 28B of the ring gear 24B. Moreover, the outer race 52 is positioned by the inner circumferential face of the reducer case 11 and prevented from being rotated. When the vehicle travels forward, the one-way clutch 50 is configured so as to engage, thereby locking the rotations of the ring gears 24A and 24B. More specifically, the one-way clutch 50 is configured so as to lock or disengage the ring gears 24A and 24B depending on the actuation direction of the torque acting on the ring gears 24A and 24B; assuming that the rotation directions of the sun gears 21A and 21B are forward directions when the vehicle travels forward, in the case that reverse rotation direction torque is applied to the ring gears 24A and 24B, the rotations of the ring gears 24A and 24B are locked.

In the drive device 1B configured as detailed above, the planetary gear reducers 12A and 12B are opposed to each other at the central section in the axial direction, the ring gear 24A of the planetary gear reducer 12A is connected to the ring gear 24B of the planetary gear reducer 12B, and the connected ring gears 24A and 24B are rotatably supported by the cylindrical support 42 of the reducer case 11 via the bearing 43. Furthermore, the hydraulic brake 60 is provided in the space between the outer diameter side of the planetary gear reducer 12A and the reducer case 11, the one-way clutch 50 is provided in the space between the outer diameter side of the planetary gear reducer 12B and the reducer case 11, and the piston 37 for actuating the hydraulic brake 60 is disposed on the outer diameter side of the bearing 34 and between the hydraulic brake 60 and the one-way clutch 50.

Since the drive device 1A according to the first embodiment and the drive device 1B according to the second embodiment, configured as detailed above, perform the same action, the control of these drive devices will be described below collectively. In the following descriptions, the drive device 1A according to the first embodiment and the drive device 1B according to the second embodiment are collectively referred to as a drive device 1, the hydraulic brakes 60A and 60B of the drive device 1A according to the first embodiment and the hydraulic brake 60 of the drive device 1B according to the second embodiment are not distinguished from each other and referred to as a hydraulic brake BRK, and the one-way clutch 50 of the drive device 1A according to the first embodiment and the one-way clutch 50 according to the second embodiment are not distinguished from each other and referred to as a one-way clutch OWC. FIGS. 7 to 12 are alignment charts in respective states, letters S and C on the left side designate the sun gear 21A of the planetary gear reducer 12A connected to the electric motor 2A and the planetary carrier 23A connected to the axle 10A, respectively, and letters S and C on the right side designate the sun gear 21B of the planetary gear reducer 12B connected to the electric motor 2B and the planetary carrier 23B connected to the axle 10B, respectively. Letter R designates the ring gears 24A and 24B, respectively. In the following descriptions, the rotation direction of the sun gears 21A and 21B at the time of forward travel is assumed to be a forward rotation direction. In addition, in each chart, the upper portion thereof represents the rotation in the forward rotation direction from the stop state of the vehicle and the lower portion thereof represents the rotation in the reverse rotation direction; furthermore, an upward arrow indicates torque in the forward rotation direction and a downward arrow indicates torque in the reverse rotation direction.

Figure 7:
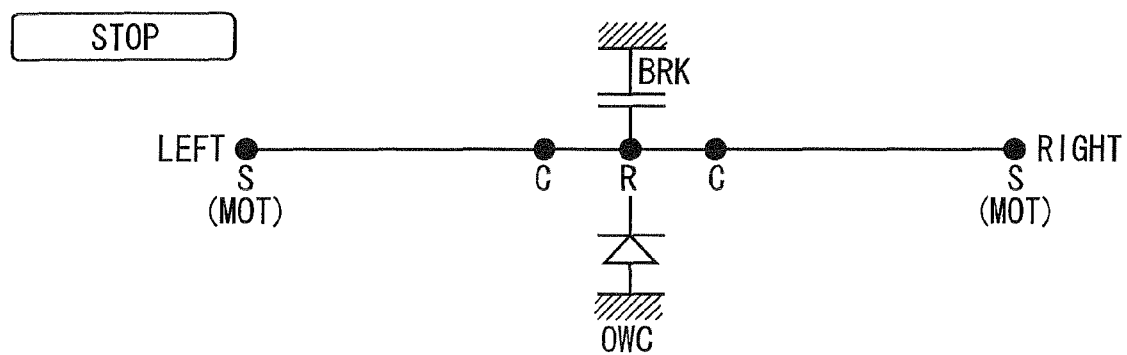
FIG. 7 is an alignment chart for the drive device at the stop time of the vehicle.

FIG. 7 is an alignment chart at the stop time of the vehicle. Since the electric motors 2A and 2B are stopped and the axles 10A and 10B are also stopped at this time, no torque is applied to these components.

Figure 8:
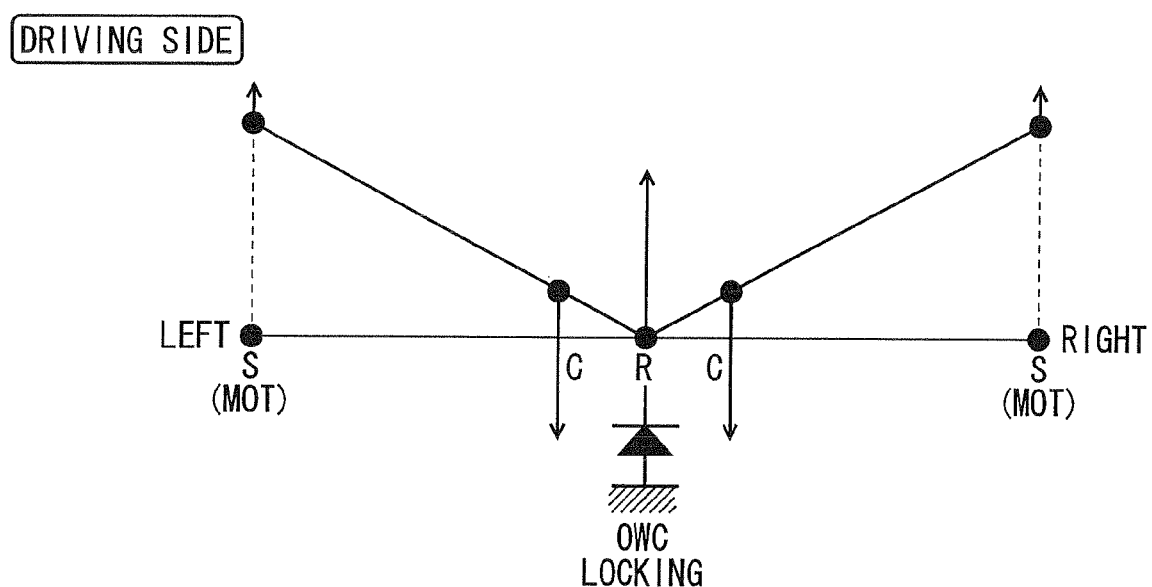
FIG. 8 is an alignment chart for the drive device in the case that the vehicle travels forward while the drive device is on the driving side.

FIG. 8 is an alignment chart obtained in the case that the vehicle travels forward by virtue of the motor torque of the electric motors 2A and 2B of the drive device 1, that is, in the case that the vehicle travels forward while the drive device 1 is on the driving side. When the electric motors 2A and 2B are driven, forward rotation direction torque is applied to the sun gears 21A and 21B. At this time, as detailed above, the ring gears 24A and 24B are locked by the one-way clutch OWC, and forward rotation direction locking torque is applied to the ring gears 24A and 24B trying to rotate in the reverse rotation direction. Hence, the planetary carriers 23A and 23B rotate in the forward rotation direction, and the vehicle travels forward. Travel resistances from the axles 10A and 10B are applied to the planetary carriers 23A and 23B in the reverse rotation direction. In this way, at the travel time of the vehicle, ignition is turned ON and the torque of the electric motors 2A and 2B is raised, whereby the one-way clutch OWC is engaged mechanically and the ring gears 24A and 24B are locked; hence, the vehicle can be started without operating the oil pump 70 for actuating the hydraulic brake BRK. As a result, the responsiveness at the start time of the vehicle can be improved.

Figure 9:
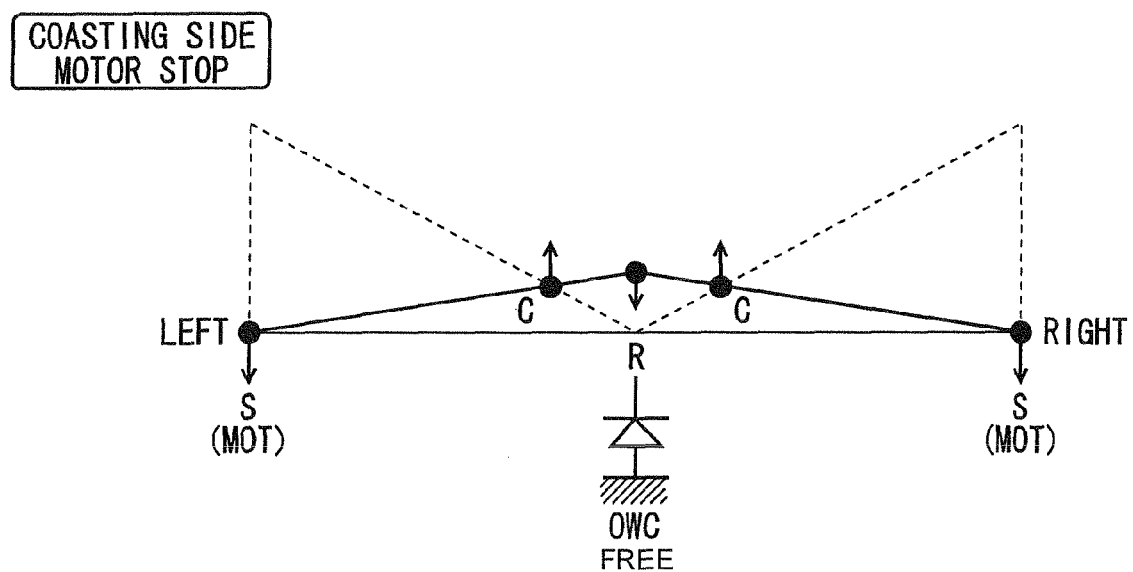
FIG. 9 is an alignment chart for the drive device in the case that the vehicle travels forward while the drive device is on the coasting side and electric motors are stopped.

FIG. 9 is an alignment chart obtained in the case that the electric motors 2A and 2B are stopped in a state in which the vehicle is traveling forward by virtue of the drive device 6 or in a state in which the vehicle is towed in the forward direction by another vehicle or the like, that is, in the case that the drive device 1 is on the coasting side and the electric motors 2A and 2B are stopped. When the electric motors 2A and 2B are stopped from the state shown in FIG. 8, forward rotation direction torque trying to continue the forward travel is applied from the axles 10A and 10B to the planetary carriers 23A and 23B, whereby reverse rotation direction torque is applied to the ring gears 24A and 24B and the one-way clutch OWC is released. Hence, the ring gears 24A and 24B rotate idly at a speed higher than that of the planetary carriers 23A and 23B. For this reason, in the case that the regeneration of the electric motors 2A and 2B is not necessary, unless the ring gears 24A and 24B are not locked by the hydraulic brake BRK, the electric motors 2A and 2B are stopped, whereby accompanied rotations of the electric motors 2A and 2B can be prevented. At this time, forward direction cogging torque is applied to the electric motors 2A and 2B, and the total of the cogging torque and the torque equivalent to the friction of the ring gears 24A and 24B becomes an axle loss in the axles 10A and 10B.

Figure 10:
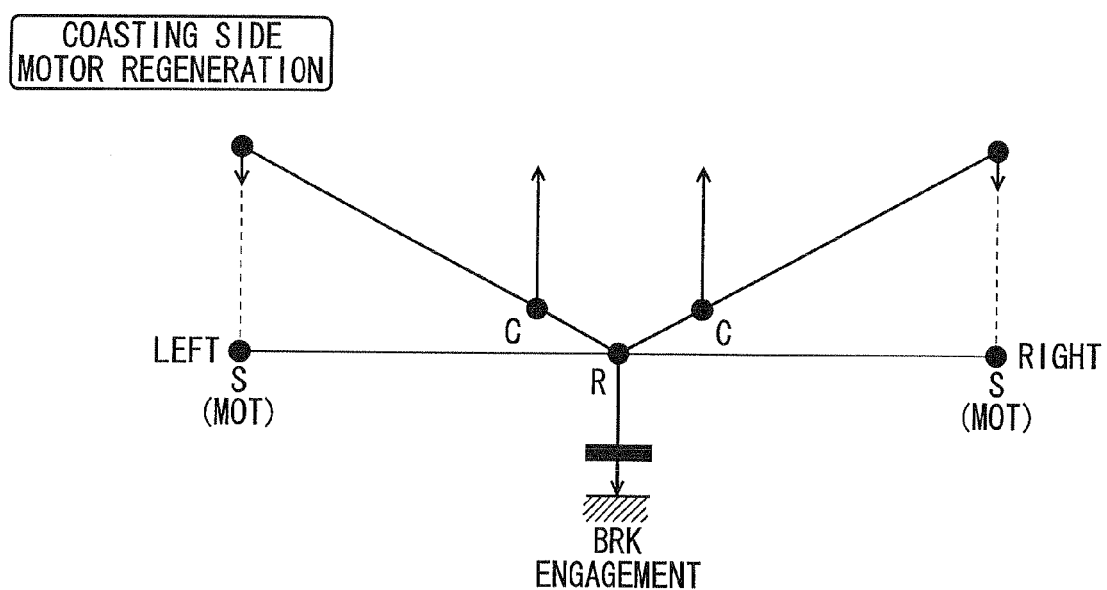
FIG. 10 is an alignment chart for the drive device in the case that the vehicle travels forward while the drive device is on the coasting side and the regeneration of the electric motors is carried out.

FIG. 10 is an alignment chart obtained in the case that regeneration is carried out by the electric motors 2A and 2B in a state in which the vehicle travels forward by virtue of the drive device 6 and the vehicle is decelerated spontaneously with the accelerator OFF or in a state in which the vehicle is decelerated by braking using the brake, that is, in the case that the drive device 1 is on its coasting side and the electric motors 2A and 2B perform regeneration. When the electric motors 2A and 2B perform regeneration from the state shown in FIG. 8, forward rotation direction torque trying to continue the forward travel is applied from the axles 10A and 10B to the planetary carriers 23A and 23B, whereby reverse rotation direction torque is applied to the ring gears 24A and 24B and the one-way clutch OWC is released. At this time, the hydraulic brake BRK is engaged and reverse rotation direction locking torque is applied to the ring gears 24A and 24B, whereby the ring gears 24A and 24B are locked and the reverse rotation direction regeneration torque is applied to the electric motors 2A and 2B. As a result, regenerative charging can be performed by the electric motors 2A and 2B.

Figure 11:
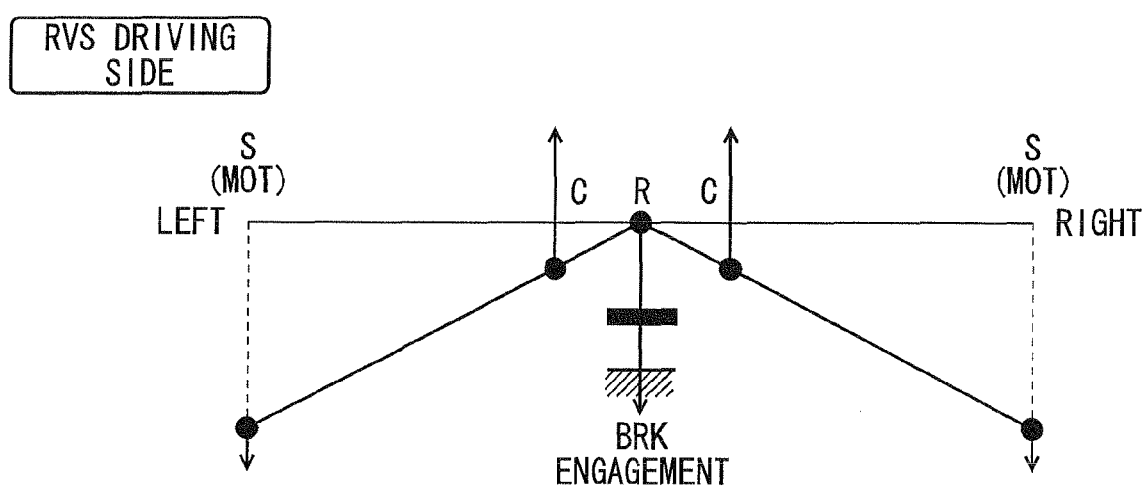
FIG. 11 is an alignment chart for the drive device in the case that the vehicle travels rearward while the drive device is on the driving side.

FIG. 11 is an alignment chart obtained in the case that the vehicle travels rearward by virtue of the motor torque of the electric motors 2A and 2B of the drive device 1, that is, in the case that the vehicle travels rearward while the drive device 1 is on its driving side. When the electric motors 2A and 2B are driven in the reverse rotation direction, reverse rotation direction torque is applied to the sun gears 21A and 21B. At this time, forward rotation direction torque is applied to the ring gears 24A and 24B and the one-way clutch OWC is released. At this time, the hydraulic brake BRK is engaged and reverse direction locking torque is applied to the ring gears 24A and 24B, whereby the ring gears 24A and 24B are locked, the planetary carriers 23A and 23B are rotated in the reverse rotation direction, and the vehicle travels rearward. Travel resistances from the axles 10A and 10B are applied to the planetary carriers 23A and 23B in the forward rotation direction.

Figure 12:
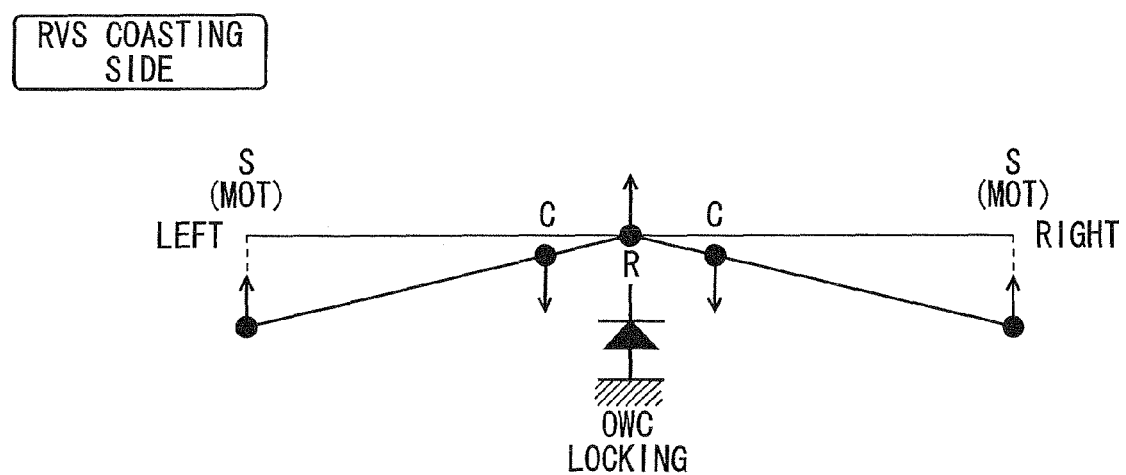
FIG. 12 is an alignment chart for the drive device in the case that the vehicle travels rearward while the drive device is on the coasting side.

FIG. 12 is an alignment chart obtained in the case that the vehicle travels rearward by virtue of the drive device 6 or in a state in which the vehicle is towed in the rearward direction by another vehicle or the like, that is, in the case that the drive device 1 is on the coasting side when the vehicle travels rearward. At this time, reverse rotation direction torque trying to continue the rearward travel is applied from the axles 10A and 10B to the planetary carriers 23A and 23B; hence, the ring gears 24A and 24B are locked by the one-way clutch OWC, forward direction locking torque is applied to the ring gears 24A and 24B trying to rotate in the reverse rotation direction, and forward rotation direction counter electromotive forces are generated in the electric motors 2A and 2B.

FIG. 13 is a view showing the states of the electric motors 2A and 2B and the states of the disengagement mechanisms (the one-way clutch OWC and the hydraulic brake BRK) in the travel state of the vehicle. "Front" represents the drive device 6 for driving the front wheels Wf, "rear" represents the drive device 1 for driving the rear wheels Wr, o indicates active (including drive and regeneration), and x indicates inactive (stop). Furthermore, "MOT state" represents the states of the electric motors 2A and 2B of the drive device 1.

At the stop time of the vehicle, the electric motors 2A and 2B of the drive device 1 are stopped, both the drive device 6 on the sides of the front wheels Wf and the drive device 1 on the sides of the rear wheels Wr are stopped, and the disengagement mechanisms are also in inactive states as described referring to FIG. 7.

Next, after the ignition is turned ON, at the time of EV start, the electric motors 2A and 2B of the drive device 1 for the rear wheels Wr are driven. At this time, as described referring to FIG. 8, the disengagement mechanisms are locked by the one-way clutch OWC, and the drive power of the electric motors 2A and 2B is transmitted to the axles 10A and 10B.

Then, at the time of acceleration, four-wheel driving is carried out using the drive device 6 on the sides of the front wheels Wf and the drive device 1 on the sides of the rear wheels Wr; at this time, as described referring to FIG. 8, the disengagement mechanisms are locked by the one-way clutch OWC and the drive power of the electric motors 2A and 2B is transmitted to the axles 10A and 10B.

At the time of EV cruise at low and medium speed ranges, since the efficiency of the motors is high, the drive device 6 on the sides of the front wheels Wf is inactive and rear-wheel driving is carried out using the drive device 1 on the sides of the rear wheels Wr. At this time, as described referring to FIG. 8, the disengagement mechanisms are locked by the one-way clutch OWC and the drive power of the electric motors 2A and 2B is transmitted to the axles 10A and 10B.

On the other hand, at the time of high speed cruise at a high speed range, since the efficiency of the engine is high, front-wheel driving is carried out using the drive device 6 on the sides of the front wheels Wf. At this time, as described referring to FIG. 9, the one-way clutch OWC of the disengagement mechanisms is released (OWC free) and the hydraulic brake BRK is inactive, whereby the electric motors 2A and 2B are stopped.

Furthermore, also in the case of spontaneous deceleration, as described referring to FIG. 9, the one-way clutch OWC of the disengagement mechanisms is released (OWC free) and the hydraulic brake BRK is inactive, whereby the electric motors 2A and 2B are stopped.

On the other hand, in the case of deceleration regeneration, for example, in the case that driving is carried out by the drive power of the drive device 6 on the sides of the front wheels Wf, as detailed above referring to FIG. 10, the one-way clutch OWC of the disengagement mechanisms is released (OWC free), but the hydraulic brake BRK is engaged, whereby regenerative charging is performed by the electric motors 2A and 2B.

During normal traveling, traveling energy is recovered by performing regeneration using the electric motors 2A and 2B in cooperation with the vehicle braking control; however, when emergency braking is required (ABS activation), the regeneration of the electric motors 2A and 2B is prohibited and priority is given to vehicle braking. In this case, the one-way clutch OWC is released (OWC free) and the hydraulic brake BRK is inactive, whereby the electric motors 2A and 2B are stopped.

In the case of rearward traveling, the drive device 6 on the sides of the front wheels Wf is stopped and the drive device 1 on the sides of the rear wheels Wr is driven and rear-wheel driving is carried out, or four-wheel driving is carried out using the drive device 6 on the sides of the front wheels Wf and the drive device 1 on the sides of the rear wheels Wr. At this time, as detailed above referring to FIG. 11, the electric motors 2A and 2B are rotated in the reverse rotation direction, and the one-way clutch OWC of the disengagement mechanisms is released (OWC free); however, by the connection of the hydraulic brake BRK, the drive power of the electric motors 2A and 2B is transmitted to the axles 10A and 10B.

Moreover, in the case that towing is performed in the forward direction (FWD towed), as detailed above referring to FIG. 9, the one-way clutch OWC of the disengagement mechanisms is released (OWC free) and the hydraulic brake BRK is inactive, whereby the electric motors 2A and 2B are stopped. In the case of FWD towed and in the case that regeneration is carried out by the electric motors 2A and 2B, the hydraulic brake BRK is connected as in the case of deceleration regeneration.

Still further, in the case that the electric motors 2A and 2B cannot be driven because of a failure in the high-voltage system, such as a failure in the PDU, front-wheel driving is carried out by the drive device 6 on the sides of the front wheels Wf. At this time, as described referring to FIG. 9, the one-way clutch OWC of the disengagement mechanisms is released (OWC free) and the hydraulic brake BRK is inactive, whereby the electric motors 2A and 2B are stopped.

Figure 14:
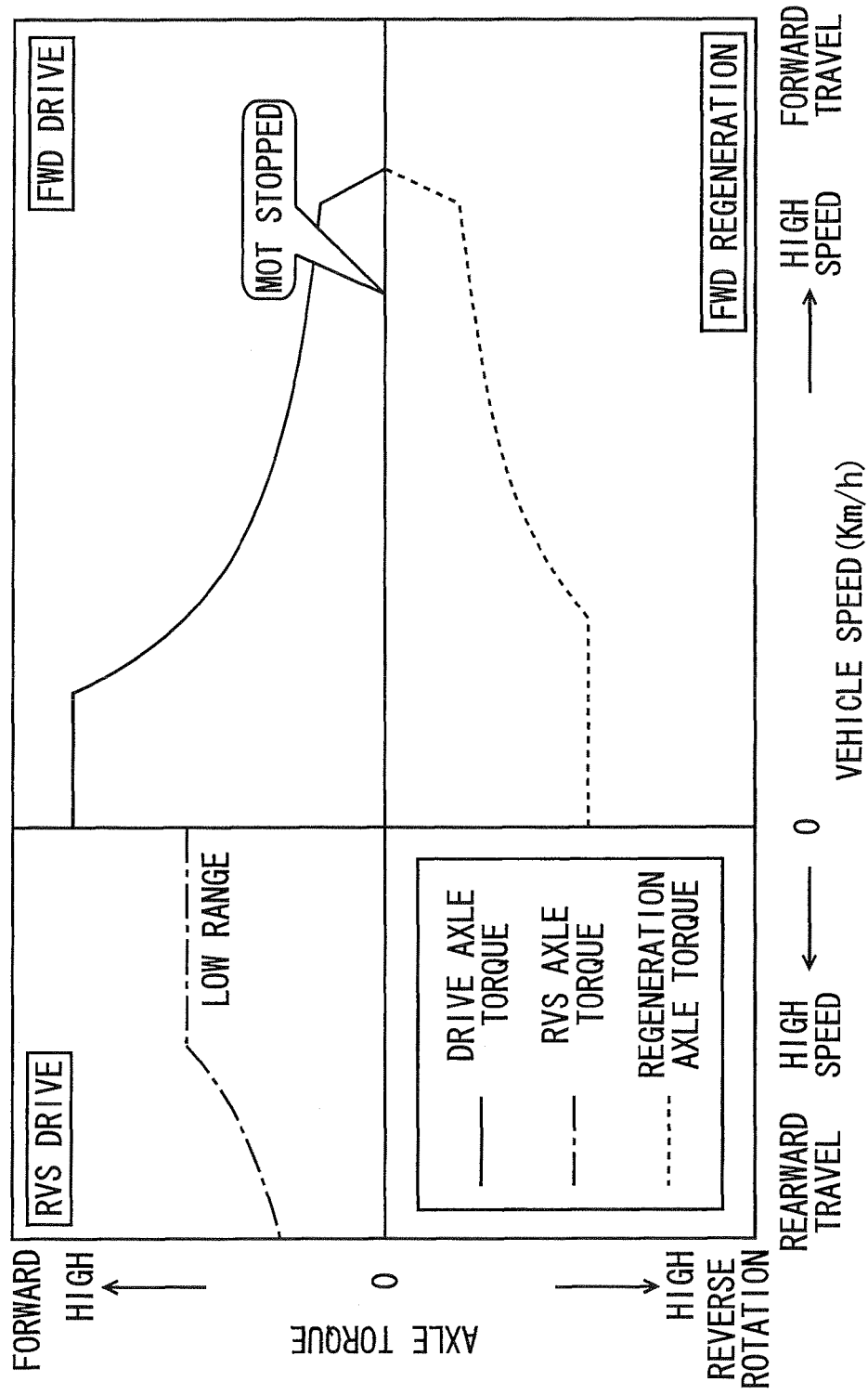
FIG. 14 is a characteristic diagram showing the drive power of the electric motors of the drive device.

FIG. 14 is a characteristic diagram showing drive power at the time of forward traveling (FWD drive), at the time of forward traveling and regeneration (FWD regeneration) and at the time of reverse traveling (RVS drive) using the electric motors 2A and 2B of the drive device 1. In the figure, the upper right area indicates axle torque at the time of forward traveling (FWD drive), the lower right area indicates axle torque at the time of forward traveling and regeneration (FWD regeneration), and the upper left area indicates axle torque at the time of reverse traveling (RVS drive).

As shown in FIG. 14, the axle torque at the time of FWD regeneration and the axle torque at the time of RVS drive in the drive device 1 according to the present invention are set so as to be lower than the axle torque at the time of FWD drive. Hence, at the time of FWD regeneration and at the time of RVS drive, as detailed above referring to FIGS. 10 and 11, braking is carried out by the hydraulic brake BRK; however, since the regeneration torque and the reverse torque are set low, the capacity of the brake can be set low, and the number of the stationary plates 35A and 35B and the number of the rotation plates 36A and 36B can be reduced; besides, since the hydraulic pressure is set low, pump loss can be reduced.

In the drive device 1A according to the first embodiment described above, in the case that the electric motors 2A and 2B are driven and the vehicle travels forward, the one-way clutch 50 is provided so that the drive power can be transmitted; hence, the drive power is transmitted by the engagement of the one-way clutch 50 without using hydraulic pressure at the start time of the vehicle, whereby the responsiveness at the start time of the vehicle can be improved.

Furthermore, in the case that the driving and regeneration of the electric motors 2A and 2B are required and in the case that the one-way clutch 50 is released, the driving and regeneration of the electric motors 2A and 2B can be carried out by the engagement of the hydraulic brake BRK; what is more, in the case that the driving and regeneration of the electric motors 2A and 2B are not required, accompanied rotations of the electric motors 2A and 2B can be prevented by releasing the hydraulic brake BRK. As a result, the electric motors 2A and 2B can be operated at a necessary minimum and fuel consumption can be improved.

In addition, in the drive device 1A according to the first embodiment, the one-way power transmission device is formed of the one-way clutch 50 and the two-way power transmission device is formed of the hydraulic brakes 60A and 60B, whereby the one-way power transmission device and the two-way power transmission device can be configured using simple configurations.

Furthermore, in the drive device 1A according to the first embodiment, the reducer is formed of the planetary gear reducers 12A and 12B, whereby the reducer can be made compact.

Moreover, in the drive device 1A according to the first embodiment, duplex pinions are used as the planetary gears 22A and 22B, whereby the reduction ratio can be made large and the electric motors can be made compact. Besides, since the ring gears 24A and 24B are disposed on the outer circumferential sides of the small-diameter second pinions 27A and 27B of the duplex pinions, the outer diameter thereof can be made smaller than that when the ring gears are disposed on the outer circumferential sides of the first pinions 26A and 26B. Still further, since the hydraulic brakes 60A and 60B overlap the first pinions 26A and 26B in the radial direction and overlap the second pinions 27A and 27B in the axial direction, the entire size of the drive device 1 can be made compact.

In addition, in the drive device 1A according to the first embodiment, since the planetary gear reducers 12A and 12B and the electric motors 2A and 2B are disposed for the left and right wheels, respectively, the left and right wheels can be controlled independently and driving stability (turning) performance can be improved. Hence, in comparison with a case in which the turning performance is improved by using one electric motor and two friction members, the loss due to heat generation caused by the slip control of the friction members can be suppressed; hence, it is possible to attain a specification ideally suited for a case in which the drive device is mounted on a hybrid vehicle, for example.

Furthermore, in the drive device 1A according to the first embodiment, the planetary gear reducers 12A and 12B and the electric motors 2A and 2B are coaxially disposed for the left and right wheels, respectively, and the left and right electric motors 2A and 2B are also coaxially disposed, whereby in the case that the drive device 1 is formed into an approximately cylindrical shape, its vehicle mounting performance can be improved.

Moreover, in the drive device 1A according to the first embodiment, a one-way clutch 50C is commonly used for both the left and right sides, whereby the number of components thereof can be reduced.

Besides, in the drive device 1A according to the first embodiment, since the one-way clutch 50C is disposed coaxially with the electric motors 2A and 2B and between the planetary gear reducers 12A and 12B, the radial length of the drive device 1A can be shortened.

What is more, in the drive device 1A according to the first embodiment, the ring gear 24A of the planetary gear reducer 12A is separate from the ring gear 24B of the planetary gear reducer 12B, whereby the assembling performance thereof can be improved, and the left and right ring gears 24A and 24B are spline-connected to the inner race 51 of the one-way clutch 50, whereby the integrity of the ring gears 24A and 24B can be attained securely.

Still further, in the drive device 1A according to the first embodiment, the oil pump 70 for controlling the hydraulic brakes 60A and 60B is disposed between the supports 13a and 13b of the frame member 13, whereby empty space can be utilized effectively.

In addition, in the drive device 1A according to the first embodiment, the bearings 33A and 33B for supporting the planetary gears 22A and 22B are disposed on the inner diameter sides of the curved intermediate walls 18A and 18B and on the sides of the planetary gear reducers 12A and 12B, and the bus rings 41A and 41B are disposed on the outer diameter sides of the intermediate walls 18A and 18B and on the sides of the electric motors 2A and 2B, whereby the length of the drive device 1A in the width direction of the vehicle can be shortened.

Furthermore, in the drive device 1B according to the second embodiment, since the electric motors 2A and 2B and the planetary gear reducers 12A and 12B are provided for the left and right drive axles 10A and 10B, respectively, the left and right wheels LWr and RWr can be controlled independently and driving stability (turning) performance can be improved. Hence, in comparison with a case in which the turning performance is improved by using one electric motor and two friction members, the loss due to heat generation caused by the slip control of the friction members can be suppressed; hence, it is possible to attain a specification ideally suited for a case in which the drive device is mounted on a hybrid vehicle, for example.

Moreover, the ring gears 24A and 24B, each being one of the three rotation elements constituting the left and right planetary gear reducers 12A and 12B, are connected to each other, whereby the members for controlling the rotations of the ring gears 24A and 24B, for example, the one-way clutch 50 and the hydraulic brake 60, can be used in common, whereby the drive device 1 can be made compact and the number of components thereof can be reduced.

Besides, in the drive device 1B according to the second embodiment, in the case that the electric motors 2A and 2B are driven and the vehicle travels forward, the one-way clutch 50 is disposed so that drive power can be transmitted, whereby the drive power can be transmitted by the engagement of the one-way clutch 50 without using hydraulic pressure at the start time of the vehicle and the responsiveness at the start time of the vehicle can be improved.

What is more, in the case that the driving and regeneration of the electric motors 2A and 2B are necessary and the one-way clutch 50 is released, the driving and regeneration of the electric motors 2A and 2B can be carried out by the engagement of the hydraulic brake 60; and in the case that the driving and regeneration of the electric motors 2A and 2B are not necessary, accompanied rotations of the electric motors 2A and 2B can be prevented by the release of the hydraulic brake 60. Hence, the electric motors 2A and 2B can be operated at a necessary minimum and fuel consumption can be improved.

Still further, in the drive device 1B according to the second embodiment, the one-way clutch 50 and the hydraulic brake 60 are disposed in the connected ring gears 24A and 24B, whereby both the one-way clutch 50 and the hydraulic brake 60 can be used in common for the left and right units.

In addition, in the drive device 1B according to the second embodiment, the one-way clutch 50 and the hydraulic brake 60 being used in common are disposed on one side and on the other side in the axial direction, that is, on the side of the planetary gear reducer 12B and on the side of the planetary gear reducer 12A, whereby the length in the radial direction can be shortened and the drive device 1 can be made compact.

Furthermore, in the drive device 1B according to the second embodiment, the one-way power transmission device is formed of the one-way clutch 50 and the two-way power transmission device is formed of the brake, whereby the one-way power transmission device and the two-way power transmission device can be configured using simple configurations.

Besides, in the drive device 1B according to the second embodiment, the two-way power transmission device is formed of the hydraulic brake 60 and the piston 37 for actuating the hydraulic brake 60 is disposed between the one-way clutch 50 and the hydraulic brake 60, whereby the space formed between the one-way clutch 50 and the hydraulic brake 60 can be used effectively and the drive device 1B can be made compact.

What is more, in the drive device 1B according to the second embodiment, the reducers are formed of the planetary gear reducers 12A and 12B, whereby a large reduction ratio can be obtained by a simple configuration.

Still further, in the drive device 1B according to the second embodiment, duplex pinions are used as the planetary gears 22A and 22B of the planetary gear reducers 12A and 12B, whereby the reduction ratio can be made large and the electric motors 2A and 2B can be made compact. Besides, the one-way clutch 50 is disposed so as to overlap the large-diameter first pinion 26B of the duplex pinions of the planetary gear reducer 12B in the radial direction and to overlap the small-diameter second pinion 27B in the axial direction, and the hydraulic brake 60 is disposed so as to overlap the large-diameter first pinion 26A of the duplex pinions of the planetary gear reducer 12A in the radial direction and to overlap the small-diameter second pinion 27A in the axial direction, whereby the lengths thereof in the radial direction and the axial direction can be made shortened and the drive device 1B can be made compact.

In addition, in the drive device 1B according to the second embodiment, the electric motors 2A and 2B and the planetary gear reducers 12A and 12B are disposed coaxially in this order from the outside in the axial direction, and the electric motors 2A and 2B are also disposed so as to be coaxial with each other, whereby the drive device 1 can be formed into an approximately cylindrical shape. Hence, its vehicle mounting performance thereof can be improved.

Furthermore, in the drive device 1B according to the second embodiment, the bearing 43 for rotatably supporting the connected ring gears 24A and 24B with respect to the reducer case 11 is disposed between the planetary gear reducers 12A and 12B opposed to each other in the axial direction, whereby the space formed between the planetary gear reducers 12A and 12B can be used effectively and the drive device 1 can be made compact.

Moreover, in the drive device 1B according to the second embodiment, the piston 37 of the hydraulic brake 60 is disposed outside the bearing 43 in the radial direction, whereby the space outside the bearing 43 in the radial direction can be used effectively and the drive device 1 can be made compact.

However, the present invention is not limited to the above-mentioned embodiments, but can be subjected modifications, improvements, etc. as necessary.

Figure 15:
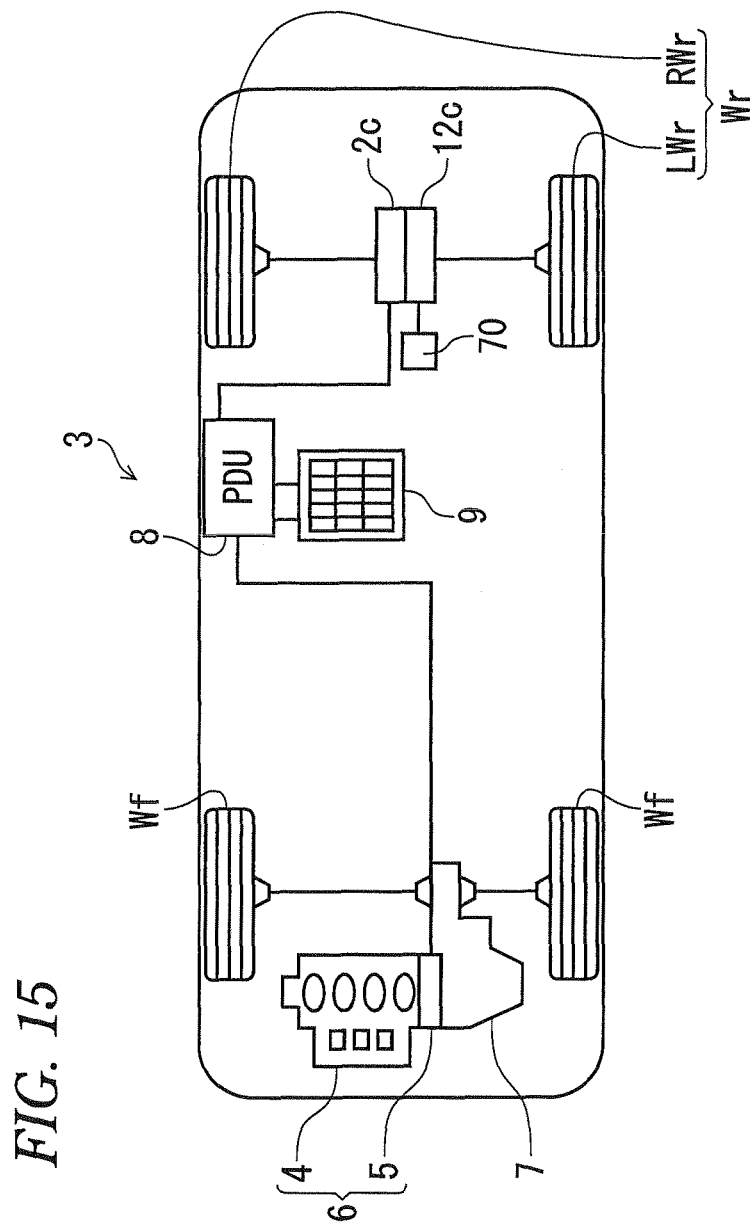
FIG. 15 is a block diagram showing a schematic configuration of a hybrid vehicle according to an embodiment of a vehicle to which a drive device according to a modified embodiment of the first embodiment is applicable.
Figure 16:
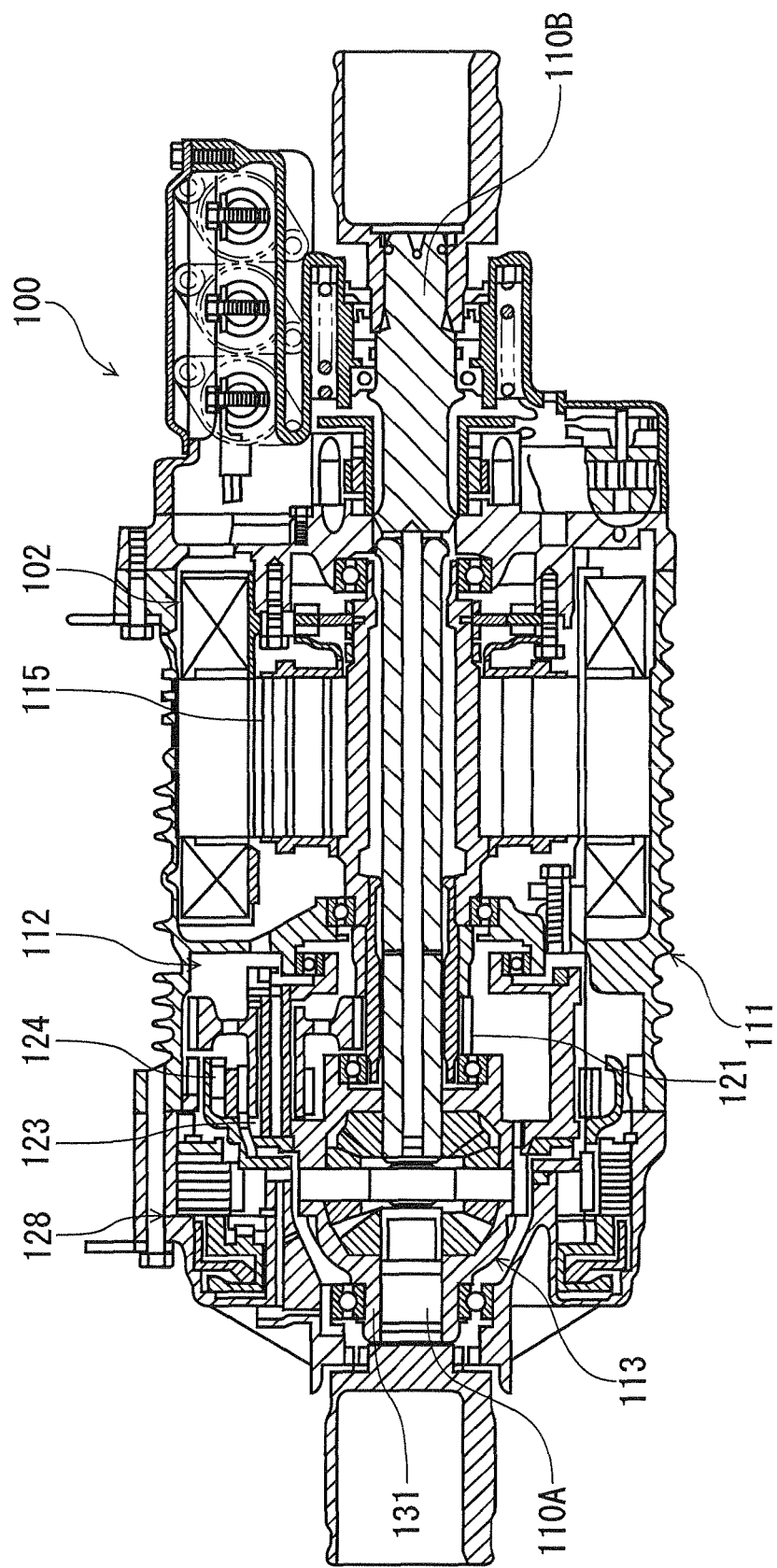
FIG. 16 is a vertical sectional view showing the drive device described in Patent document 1.

The drive device 1A according to the first embodiment is configured so that the two electric motors 2A and 2B are provided with the planetary gear reducers 12A and 12B, respectively, to control the left rear wheel LWr and the right rear wheel RWr, respectively; however, without being limited by this, as shown in FIG. 15, the drive device may be configured so that one electric motor 2C and one reducer 12C are connected to a differential apparatus, not shown. In FIG. 15, the same components as those according to the above-mentioned embodiments are designated by the same reference codes and their descriptions are omitted.

The present application is based on Japanese Patent Application No. 2009-087771 filed on Mar. 31, 2009 and Japanese Patent Application No. 2009-087772 filed on Mar. 31, 2009, and the contents thereof are herein incorporated by reference.

EXPLANATIONS OF LETTERS AND NUMERALS 1, 1A, 1B drive device
2A electric motor (first electric motor)
2B electric motor (second electric motor)
10A axle (left wheel drive axle, drive axle)
10B axle (right wheel drive axle, drive axle)
11 reducer case
12A planetary gear reducer (first planetary gear reducer, reducer)
12B planetary gear reducer (second planetary gear reducer, reducer)
13 frame member
13$a$ support (first support)
13$b$ support (second support)
16A, 16B cylindrical shaft (output shaft)
18A, 18B intermediate wall
21A, 21B sun gear (first rotation element)
23A, 23B planetary carrier (carrier, second rotation element)
24A, 24B ring gear (third rotation element)
26A, 26B first pinion
27A, 27B second pinion
33A, 33B bearing
41A, 41B bus ring
50 one-way clutch (one-way power transmission device)
60 hydraulic brake (brake, two-way power transmission device)
60A hydraulic brake (first brake, brake, two-way power transmission device)
60B hydraulic brake (second brake, brake, two-way power transmission device)
70 oil pump
Wf front wheel
LWr left rear wheel
RWr right rear wheel

The invention claimed is:

1. A drive device for a vehicle, comprising:
an electric motor that generates a drive power of the vehicle;
a two-way power transmission device disposed on a drive power transmission passage between the electric motor and a wheel, wherein the two-way power transmission device is configured to make an electric motor side and a wheel side in a disconnected state or in a connected state when being engaged or released;
a one-way power transmission device disposed on the drive power transmission passage in parallel with the two-way power transmission device, wherein the one-way power transmission device is in an engaged state when a rotation power of the electric motor side in a forward direction is inputted to the wheel side; the one-way power transmission device is in a released state when a rotation power of the electric motor side in a reverse direction is inputted to the wheel side; the one-way power transmission device is in the released state when a rotation power of the wheel side in the forward direction is inputted to the electric motor side; and the one-way power transmission device is in the engaged state when a rotation power of the wheel side in the reverse direction is inputted to the electric motor side;
a reducer disposed on the drive power transmission passage so as to change a rotation speed of the electric motor and a rotation speed of the wheel, wherein:
the electric motor comprises: a first electric motor disposed on a left side in a vehicle width direction of the vehicle; and a second electric motor disposed on a right side in the vehicle width direction;
the reducer comprises: a first reducer disposed on the left side in the vehicle width direction; and a second reducer disposed on the right side in the vehicle width direction;
a rotation power of the first electric motor is transmitted to a left wheel via the first reducer;
a rotation power of the second electric motor is transmitted to a right wheel via the second reducer;
the first electric motor and the first reducer are disposed in this order from an outside in the vehicle width direction;
the second electric motor and the second reducer are disposed in this order from an outside in the vehicle width direction;
the first reducer and the second reducer are disposed adjacent to each other;
each of the first reducer and the second reducer is a planetary gear reducer comprising three rotation elements;
a first rotation element that is one of the three rotation elements of the first reducer and a first rotation element that is one of the three rotation elements of the second reducer are connected to each other;
the two-way power transmission device and the one-way power transmission device are provided for the first rotation elements connected to each other;
the one-way power transmission device is disposed between the three rotation elements of the first reducer and the three rotation elements of the second reducer in the vehicle width direction; and
the two-way power transmission device is disposed outside the three rotation elements of the first reducer or outside the three rotation elements of the second reducer in a radial direction of the three rotation elements.

2. The drive device of claim 1, wherein
a single one-way power transmission device is provided for the first rotation element of the first reducer and the first rotation element, which are connected to each other.

3. The drive device of claim 1, wherein the first rotation element is a ring gear, the second rotation element is a sun gear, and the third rotation element is a carrier.

4. The drive device of claim 3, wherein the carrier supports duplex pinions comprises a first pinion engaged with the sun gear and a second pinion engaged with the ring gear, wherein a diameter of the second pinion is smaller than that of the first pinion, and
the two-way power transmission device is disposed to overlap the first pinion in the radial direction and to overlap the second pinion in an axial direction of the drive device.

5. The drive device of claim 3, further comprising:
a case housing the first reducer and the second reducer therein,
wherein the one-way power transmission device is a one-way clutch, and the two-way power transmission device is a brake that connects/disconnects the case and the first rotation elements which are connected to each other.

6. The drive device of claim 5, wherein the brake is a hydraulic brake actuated by hydraulic pressure, and a piston for actuating the brake is disposed between the one-way clutch and the brake.

7. The drive vehicle of claim 3, wherein the second rotation element is connected to the electric motor and the third rotation element is connected to the wheel.

* * * * *